(12) United States Patent
Hwang et al.

(10) Patent No.: US 10,579,528 B2
(45) Date of Patent: Mar. 3, 2020

(54) ELECTRONIC DEVICE AND METHOD FOR CONTROLLING SHAREABLE CACHE MEMORY THEREOF

(71) Applicant: Samsung Electronics Co., Ltd., Gyeonggi-do (KR)

(72) Inventors: Chanyoung Hwang, Seoul (KR); Seungjin Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/957,520

(22) Filed: Dec. 2, 2015

(65) Prior Publication Data
US 2016/0154735 A1 Jun. 2, 2016

(30) Foreign Application Priority Data
Dec. 2, 2014 (KR) .................. 10-2014-0170202

(51) Int. Cl.
| | | |
|---|---|---|
| *C12N 5/00* | (2006.01) | |
| *G06F 12/084* | (2016.01) | |
| *G06F 12/0842* | (2016.01) | |
| *G06F 1/32* | (2019.01) | |

(Continued)

(52) U.S. Cl.
CPC ............. *G06F 12/084* (2013.01); *G06F 1/32* (2013.01); *G06F 1/3275* (2013.01); *G06F 12/0842* (2013.01); *G06F 12/0895* (2013.01); *G06F 2212/1028* (2013.01); *G06F 2212/20* (2013.01); *G06F 2212/455* (2013.01); *G06F 2212/604* (2013.01); *G06F 2212/62* (2013.01);

(Continued)

(58) Field of Classification Search
CPC ...... G06F 12/084; G06F 1/32; G06F 12/0842; G06F 12/0895; G06F 2212/1028; G06F 2212/20; G06F 2212/455; G06F 2212/604; G06F 2212/62; G06F 2212/1225
USPC .......................................................... 711/130
See application file for complete search history.

(56) References Cited

U.S. PATENT DOCUMENTS 6,449,671 B1 * 9/2002 Patkar ................. G06F 12/0806
710/107
7,451,333 B2 * 11/2008 Naveh ................... G06F 1/3203
713/323
(Continued)

FOREIGN PATENT DOCUMENTS

WO     WO 2010/085512     7/2010

OTHER PUBLICATIONS

Gerard Roehrl, "8086/8088 Interrupts and DOS System Programming" by Gerhard Roehrl hereinafter Roehrl, May 14, 2010, Web.*
(Continued)

*Primary Examiner* — Ramon A. Mercado

(57) ABSTRACT

An electronic device and a method for controlling a sharable cache memory of the electronic device are provided. The electronic device includes a central processing unit including at least one core processor, at least one module, and a sharable cache memory including a controller, wherein the controller enables the sharable cache memory as a cache memory of the central processing unit if the central processing unit is in a working mode, and wherein the controller enables the sharable cache memory as a buffer of at least one of modules if at least one core processor of the central processing unit is transitioned to a sleep mode.

22 Claims, 20 Drawing Sheets

(51) Int. Cl.
*G06F 12/0895* (2016.01)
*G06F 1/3234* (2019.01)
(52) U.S. Cl.
CPC .............. *Y02D 10/13* (2018.01); *Y02D 10/14* (2018.01); *Y02D 50/20* (2018.01)

(56) References Cited

U.S. PATENT DOCUMENTS

| | | | | |
|---|---|---|---|---|
| 7,996,644 | B2* | 8/2011 | Kottapalli | G06F 12/084 |
| | | | | 711/128 |
| 8,316,185 | B2 | 11/2012 | Sih et al. | |
| 9,311,245 | B2* | 4/2016 | Wells | G06F 12/084 |
| 2006/0236050 | A1* | 10/2006 | Sugimoto | G06F 11/1458 |
| | | | | 711/162 |
| 2009/0024799 | A1 | 1/2009 | Jahagirdar et al. | |
| 2010/0185820 | A1 | 7/2010 | Huges et al. | |
| 2010/0250989 | A1 | 9/2010 | Hamilton | |
| 2011/0055434 | A1* | 3/2011 | Pyers | G06F 1/3203 |
| | | | | 710/14 |
| 2011/0252180 | A1* | 10/2011 | Hendry | G06F 1/3203 |
| | | | | 711/3 |
| 2012/0331323 | A1 | 12/2012 | Choi et al. | |
| 2013/0183924 | A1* | 7/2013 | Saigh | H04W 4/025 |
| | | | | 455/404.2 |
| 2014/0052887 | A1 | 2/2014 | Sutardja et al. | |
| 2014/0298056 | A1* | 10/2014 | Seki | G06F 1/3225 |
| | | | | 713/320 |
| 2015/0128035 | A1* | 5/2015 | Takae | G06F 17/30274 |
| | | | | 715/702 |

OTHER PUBLICATIONS

C. F. Fajardo, Z. Fang, R. Iyer, G. F. Garcia, S. E. Lee and L. Zhao, "Buffer-Integrated-Cache: A cost-effective SRAM architecture for handheld and embedded platforms," 2011 48th ACM/EDAC/IEEE Design Automation Conference (DAC), New York, NY, pp. 966-971. (Year: 2011).*

P. Ranganathan, S. Adve and N. P. Jouppi, "Reconfigurable caches and their application to media processing," Proceedings of 27th International Symposium on Computer Architecture (IEEE Cat. No. RS00201), Vancouver, BC, Canada, pp. 214-224. (Year: 2000).*

W. Wang, P. Mishra and S. Ranka, "Dynamic cache reconfiguration and partitioning for energy optimization in real-time multi-core systems," 2011 48th ACM/EDAC/IEEE Design Automation Conference (DAC), New York, NY, 2011, pp. 948-953. (Year: 2011).*

International Search Report issued for PCT/KR2015/012998 dated Mar. 9, 2016, 4 pgs.

Extended European Search Report issued for 15197526.5 dated Mar. 7, 2016, 7 pgs.

* cited by examiner

ELECTRONIC DEVICE AND METHOD FOR CONTROLLING SHAREABLE CACHE MEMORY THEREOF

CROSS-REFERENCE TO RELATED APPLICATIONS AND CLAIM OF PRIORITY

The present application is related to and claims priority from and the benefit under 35 U.S.C. § 119(a) of Korean Patent Application No. 10-2014-0170202, filed on Dec. 2, 2014, which is hereby incorporated by reference for all purposes as is fully set forth herein.

TECHNICAL FIELD

The present disclosure relates to an electronic device and a method for controlling a sharable cache memory of the electronic device.

BACKGROUND

With a popularization of various types of personal mobile products, an application processor (AP) for use in the mobile products has been advanced to a level of a personal computer (PC) processor that is superior in performance and supports more functionalities. For battery-constrained mobile devices, however, battery power conservation is one of the most critical issues. In order to fulfill both higher performance and lower power requirements, a variety of techniques is applied to the AP.

Analyzing battery power usage pattern of a smartphone, about 60% of total battery power is consumed in a standby mode. Alternatively, the battery power consumption in the standby mode is larger than the user expected because various services (such as health/motion sensing services, recognition services, location services) including a basic telephony function are running in the standby mode. In order to support such services, a central processing unit (CPU) in the AP performs simple operations with external data generating periodically. Since the CPU of the AP and a main storage device (such as DRAM) basically consume higher power an AP chip needs to include various modules like hardware modules and auxiliary processing units such as a digital signal processor (DSP) capable of performing simple operations with the external data generating periodically as well as the CPU. Therefore, an efficient controlling technique for cache memory of the AP chip is needed while proving a higher performance and a lower power consumption.

SUMMARY

To address the above-discussed deficiencies, it is a primary object to provide an electronic device according to various embodiments of the present disclosure includes a central processing unit, modules, and a sharable cache memory including a controller.

As described above, a technique for the module like auxiliary processing unit such as the DSP operates before the CPU is necessary to reduce the power consumption in the standby mode. However, as the number of functions which the auxiliary processing unit is in charge of on behalf of the CPU increases, it is necessary to increase the number of internal buffers (e.g. SRAM buffer) or cache.

However, the internal buffer or cache is built as small as possible for important functions in consideration of cost. For these functions, a main memory (e.g. DRAM) is used.

However, although the lower power auxiliary device operates on behalf of the CPU, the power consumption increases due to the DRAM. Furthermore, since the DRAM is interleaved in the current AP structure, even a single access activates multiple DRAM controllers, resulting in increase of power consumption.

There is therefore a need of a method for implementing lower power mechanism by reducing the number of DRAM accesses without extra DRAMs. This is one of the critical issues in the wearable environment as well as mobile environment.

In accordance with an aspect of the present disclosure, an electronic device is provided. The electronic device includes a central processing unit including at least one core processor, modules, and a sharable cache memory including a controller, wherein the controller enables the sharable cache memory as a cache memory of the central processing unit if the central processing unit is in a working mode, and wherein the controller enables the sharable cache memory as a buffer of at least one of the modules if at least one core processor of the central processing unit is transitioned to a sleep mode.

In accordance with another aspect of the present disclosure, a cache memory control method of an electronic device having a sharable cache memory is provided. The method includes enabling a sharable cache memory as a cache memory of a central processing unit if the central processing unit is in a working mode and enabling the sharable cache memory as a buffer of at least one of modules if at least one core processor of the central processing unit is transitioned to a sleep mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
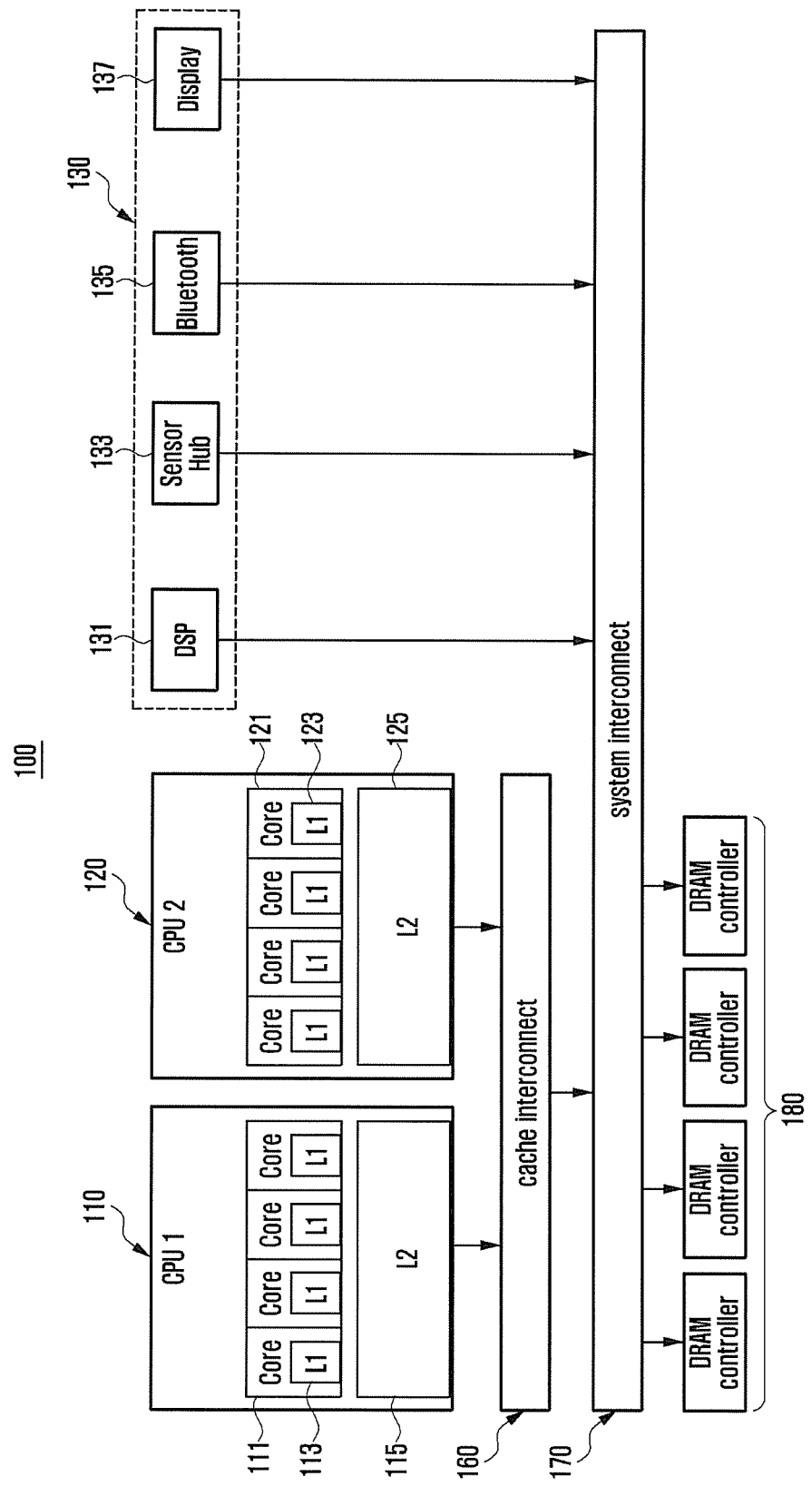
FIG. 1 is a block diagram illustrating a configuration of an electronic device including a central processing unit (CPU) and auxiliary devices according to an embodiment of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure are described with reference to the accompanying drawings in detail. Although the description is made with reference to particular embodiments, the present disclosure can be implemented with various modifications. Thus, it should be understood that there may be various equivalents and modified examples that can replace the embodiments described in the present specification and the configuration shown in the drawings. The same reference numbers are used throughout the drawings to refer to the same or like parts.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, it is understood that the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept It will be understood that when an element or layer is referred to as being "connected to" or "coupled to" another element or layer, the element or layer can be directly connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the term "electronic device" may include any processor, e.g. Application Processor (AP), for use in various mobile and wearable devices.

According to various embodiments of the present disclosure, the phrase "A Central Processing Unit (CPU) in the electronic device is in the standby state" may means that at least one of cores constituting the CPU is in the sleep state.

FIG. 1 is a block diagram illustrating a configuration of the electronic device including CPUs and auxiliary devices according to an embodiment of the present disclosure.

Various techniques are to the electronic device 100, e.g. AP, to fulfill the high performance and low power requirements. According to the embodiment of FIG. 1, the electronic device 100 includes a high performance CPU 1 110 and a low power CPU 2 120. The electronic device 100 is designed such that the CPU 1 110 with the high performance characteristic and the CPU 2 120 with the low power characteristic are connected through a dedicated system interconnect 170 and operate selectively in a task-specific manner. For example, the electronic device 100 is designed such that the lower power CPU 2 120 operates for the telephony and messenger applications and the high performance CPU 1 110 for the applications requiring high performance such as 3-Dimensional (3D) game and complex website access.

Referring to FIG. 1, the electronic device 100 includes at least one CPU 110 and 120, at least one auxiliary processing unit 130, a system interconnect 170, and a DRAM controller 180. The auxiliary processing unit 130 is one example of modules which may share caches of the CPU 110 and 120 included in the electronic device 100.

For example, the high performance CPU 1 110 may include multiple cores 111. The CPU 1 110 includes core-specific L1 caches 113 inside the respective cores 111. The electronic device 100 includes CPU-specific L2 cache 115 inside or outside the CPU 1 110. The low power CPU 2 120 is configured for use in multi-core environment so as to have multiple cores 121. The CPU 2 120 includes core-specific L1 caches 123. The electronic device 100 includes CPU-specific L2 cache 125 inside or outside the CPU 2 120. The electronic device 100 includes a cache interconnect 160 for processing data between heterogeneous CPUs integrally.

The at least one auxiliary processing unit 130 includes a digital signal processor (DSP) 131, a sensor hub 133, a Bluetooth unit 135, and a display unit 137. The Bluetooth unit 135 is just an example but the Bluetooth unit 135 may be replaced by at least one of other various communication units. The auxiliary processing unit 130 is not limited to the configuration depicted in the drawing but is configured to have other various units.

The system interconnect 170 connects the CPU 1 110, CPU 2 120, at least one auxiliary processing unit 130, and at least one DRAM controller 180. The system interconnect 170 transfers signals among the CPU 1 110, CPU 2 120, at least one auxiliary processing unit 130, and at least one DRAM controller 180.

If the connected external main memory device is a DRAM, the at least one DRAM controller 180 performs data-reading/writing operations between the DRAM and at least one of CPU 1 110, CPU 2 120, and at least one auxiliary processing unit 130. Depending on the type of the main memory device, the type of the DRAM controller 180 is changed.

The electronic device 100 operates under the control of one auxiliary processing 130, particularly the DSP 131, until the CPU is required, in order to reduce power consumption in the standby mode state. For example, the low power audio function is performed under the control of the DSP 131. However, the more the functions that the DSP 131 is in charge of on behalf of the CPU, the more buffers (e.g. SRAM) that the DSP needs. Similarly, in the case of the sensor hub 133, as the number of types and periods of sensing data to be processed increases, the sensor hub 133 needs more buffers.

FIGS. 2 to 5 are block diagrams illustrating electronic devices according to various embodiments of the present disclosure.

Figure 2:
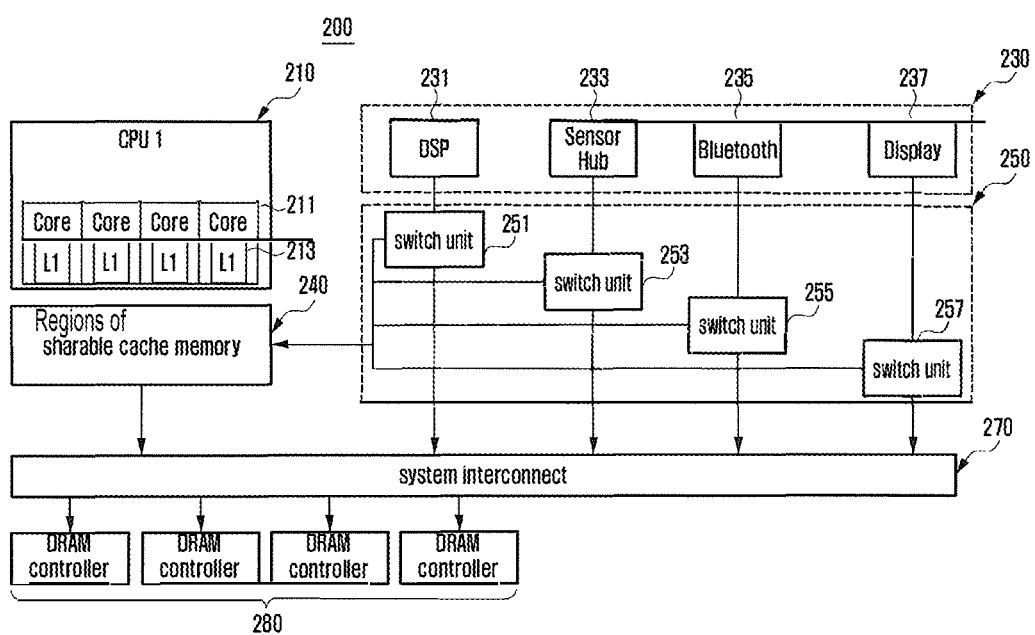
FIGS. 2 to 5 are block diagrams illustrating an electronic device according to various embodiments of the present disclosure.

In the embodiment of FIG. 2, the electronic device 200 includes a CPU 1 210, at least one auxiliary processing unit 230, a sharable cache memory 240, a switching unit 250 including at least one switch unites 251 to 257, a system interconnect 270, and at least one DRAM controller 280. For example, this embodiment is applicable to the case where the electronic device 200 is a wearable device including just one CPU due to the spatial restriction. The CPU 1 210 includes multiple cores 211, and each core includes a L1 cache 213. The at least one auxiliary processing unit 230 includes a DSP 231, a sensor hub 233, a communication unit 235 such as Bluetooth unit, and a display unit 237.

According to an embodiment of the present disclosure, the electronic device 200 uses the sharable cache memory 240 as the cache memory for the CPU 1 210 that is in the working mode and as the buffer of at least one of the auxiliary processing units 230 when at least one of the cores of the CPU 1 210 enters the sleep mode. For example, the electronic device 200 checks at least one bank allocated to at least one core switched to the sleep mode among the data memory banks in the sharable cache memory 240 and switch the at least one checked bank from the cache memory region for the CPU 1 210 to the buffer region for at least one of the auxiliary processing unit 230.

According to an embodiment of the present disclosure, the electronic device 200 controls the switch units 251 to 257 to connect the respective auxiliary processing units 230 to the system interconnect 270 or the sharable cache memory 240. In this way, it is possible to control the memory access paths of the respective auxiliary processing units 230. That is, in the case where at least one of the auxiliary processing units 230 is connected to the system interconnect 270 by means of the switch units 251 to 257, the memory access for data buffering is performed with an external DRAM (not shown) while in the case where at least one of the auxiliary processing units 230 is connected to the sharable cache memory 240 by means of the switch units 251 to 257 the memory access for data buffering is performed with the data memory inside the sharable cache memory 240.

Figure 3:
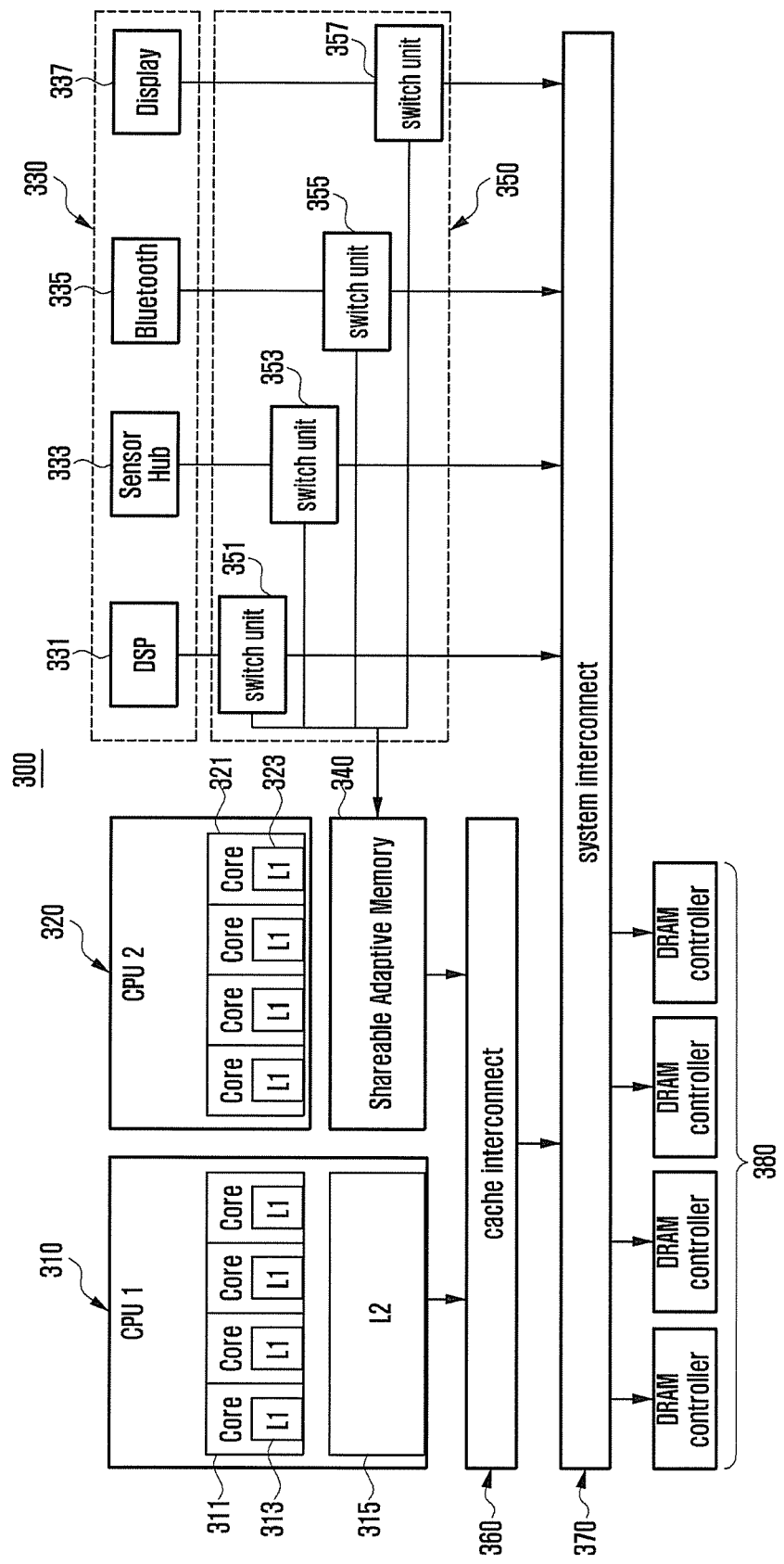

In the embodiment of FIG. 3, the electronic device 300 includes a CPU 1 310, a CPU 2 320, at least one auxiliary processing unit 330, a sharable cache memory 340, a switching unit 350 including at least one switch unit 351 to 357, a cache interconnect 360, a system interconnect 370, and at least one DRAM controller 380. For example, the CPU 1 310 and CPU 2 320 is a high performance CPU and a relatively low performance CPU, respectively, or vice versa. The CPU 1 310 includes multiple cores 311, and each core includes a L1 cache 313. The electronic device 300 includes a L2 cache 315 for CPU 1 310 inside or outside the CPU 1 310. The CPU 2 320 includes multiple cores 321, and each core includes a L1 cache 323. The at least one auxiliary processing unit 330 includes a DSP 331, a sensor hub 333, a communication unit 335 such as Bluetooth, and a display unit 337.

According to an embodiment of the present disclosure, the electronic device 300 uses the sharable cache memory 340 as the cache memory (L2 cache) of the CPU 2 320 that is in the working mode and as the buffer of the at least one of the auxiliary processing unit 330 when at least one of the cores of the CPU 2 320 enters the sleep mode. For example, the electronic device 300 checks at least one bank allocated to at least one core switched to the sleep mode among the data memory bank in the sharable cache memory 340 and switch the at least one checked bank from the cache memory region for CPU 2 320 to the buffer region for at least one of the auxiliary processing unit 330.

According to an embodiment of the present disclosure, the electronic device 300 controls the switch units 351 to 357 to connect the respective auxiliary processing units 330 to the system interconnect 370 or the sharable cache memory 340. In this way, it is possible to control the memory access paths of the respective auxiliary processing units 330. That is, in the case where at least one of the auxiliary processing units 330 is connected to the system interconnect 370 by means of the switch units 351 to 357, the memory access for data buffering is performed with an external DRAM (not shown) while in the case where at least one of the auxiliary processing units 330 is connected to the sharable cache memory 340 by means of the switch units 351 to 357 the memory access for data buffering is performed with the data memory inside the sharable cache memory 340.

Figure 4:
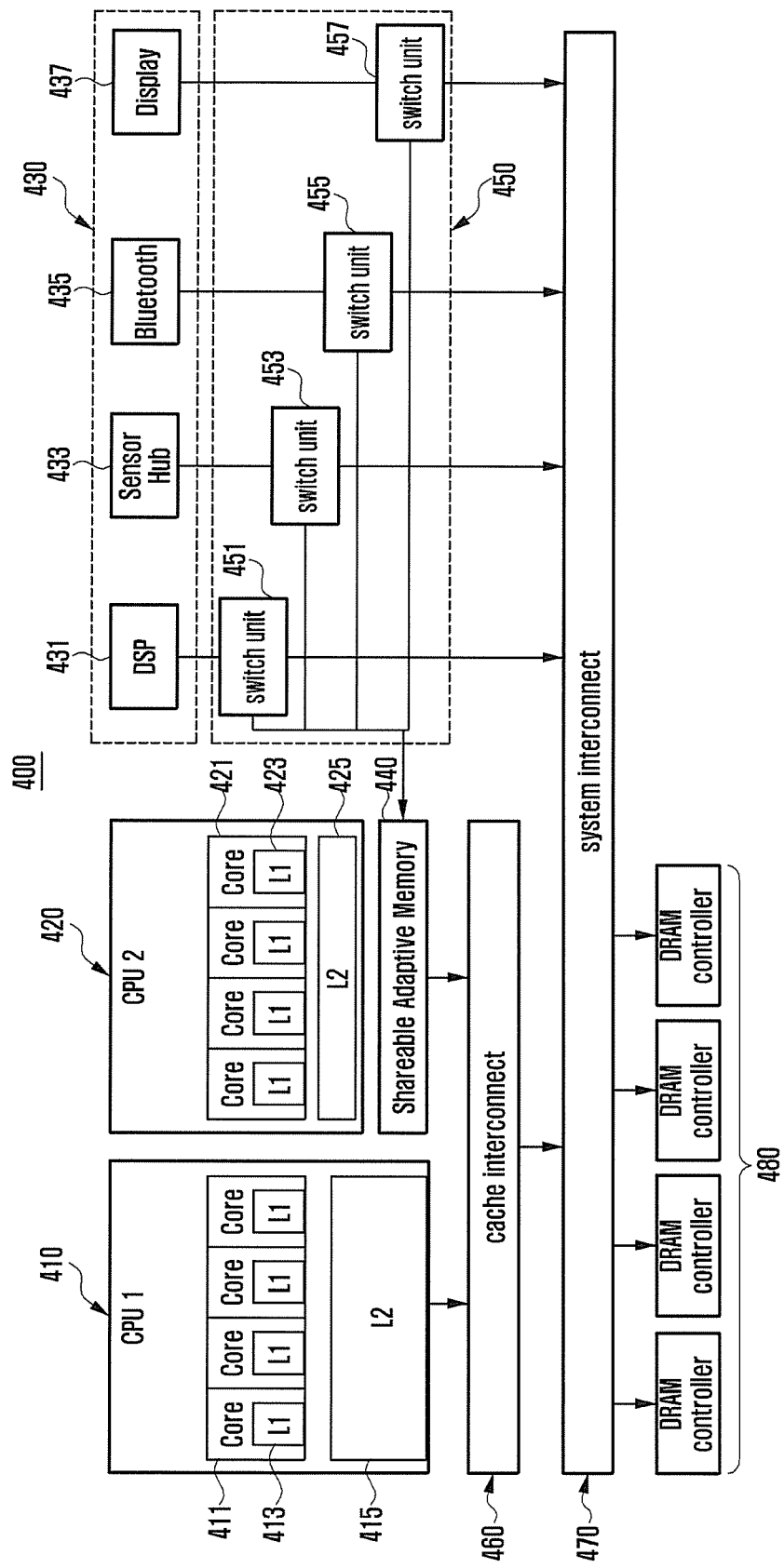

In the embodiment of FIG. 4, the electronic device includes a CPU 1 410, a CPU 2 420, at least one auxiliary processing unit 430, a sharable cache memory 440, a switching unit 450 including at least one switch unit 451 to 457, a cache interconnect 460, a system interconnect 470, and at least one DRAM controller 480. For example, the CPU 1 410 and CPU 2 420 is a high performance CPU and a relatively low performance CPU, respectively, or vice versa. The CPU 1 410 includes multiple cores 411, and each core includes a L1 cache 413. The electronic device 400 includes a L2 cache 415 for CPU 1 410 inside or outside the CPU 1 410. The CPU 2 420 includes multiple cores 421, and each core includes a L1 cache 423. The electronic device 400 includes an L2 cache 425 for the CPU 2 420 inside or outside the CPU 2 420. The at least one auxiliary processing unit 430 includes a DSP 431, a sensor hub 433, a communication unit 435 such as Bluetooth unit, and a display unit 437.

According to an embodiment of the present disclosure, the electronic device 400 uses the sharable cache memory 440 as the cache memory (L2 cache) of the CPU 2 420 which is in the working mode and as the buffer of the at least one of the auxiliary processing unit 430 when at least one of the cores of the CPU 2 420 enters the sleep mode.

Figure 5:
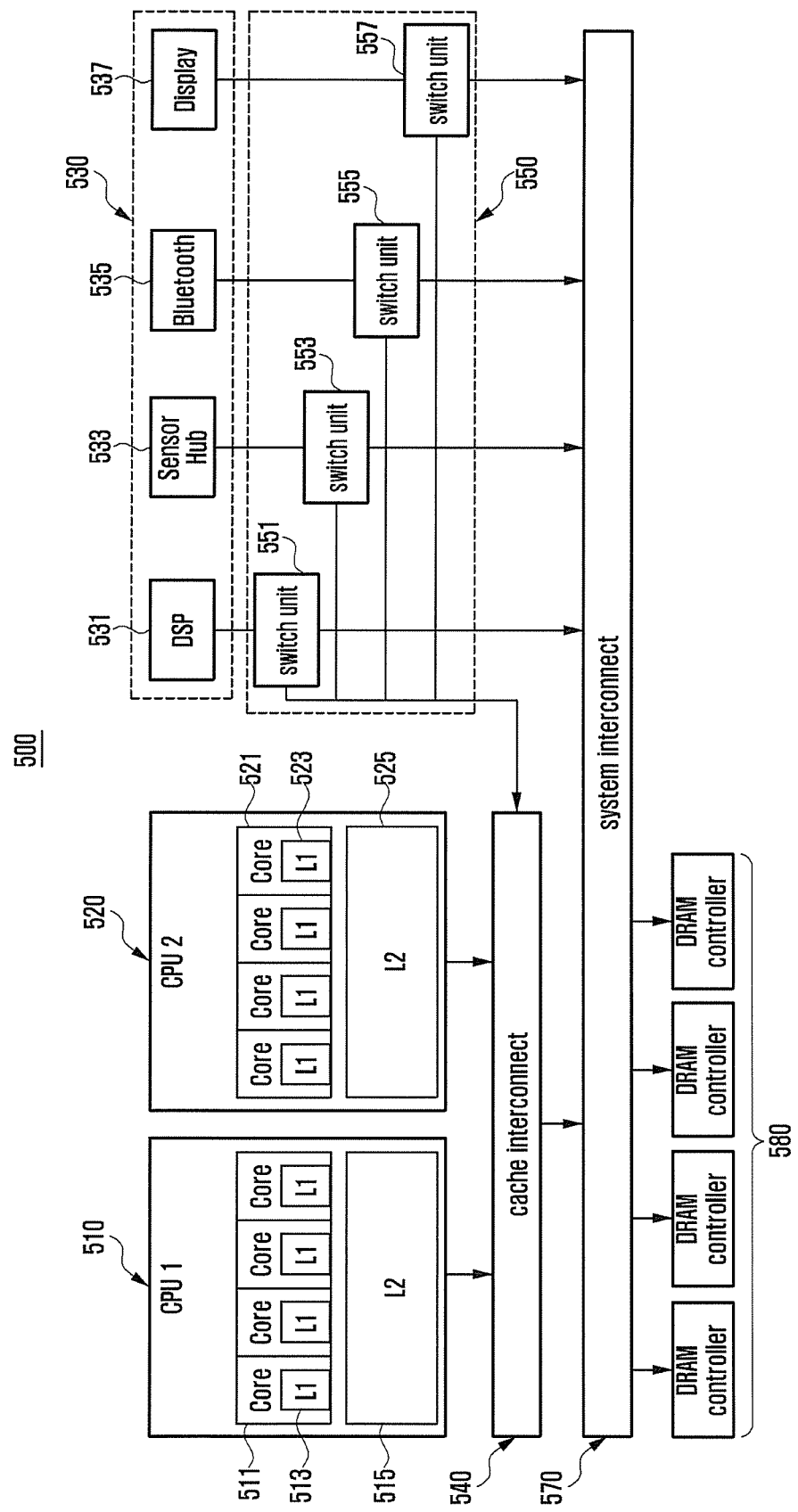

In the embodiment of FIG. 5, the electronic device includes a CPU 1 510, a CPU 2 520, at least one auxiliary processing unit 530, a sharable cache memory 540, a switching unit 550 including at least one switch unit 551 to 557, a system interconnect 570, and at least one DRAM controller 580. For example, the CPU 1 510 and CPU 2 520 are a high performance CPU and a relatively low performance CPU, respectively, or vice versa. The CPU 1 510 includes multiple cores 511, and each core includes a L1 cache 513. The electronic device 500 includes a L2 cache 515 for CPU 1 510 inside or outside the CPU 1 510. The CPU 2 520 includes multiple cores 521, and each core includes a L1 cache 523. The electronic device 500 includes an L2 cache 525 for the CPU 2 520 inside or outside the CPU 2 520. The at least one auxiliary processing unit 530 includes a DSP 531, a sensor hub 533, a communication unit 535 such as Bluetooth unit, and a display unit 537.

According to an embodiment of the present disclosure, the electronic device 500 uses the sharable cache memory 540 as the cache memory (L2 cache) of the CPU 1 510 or CPU 2 520 that is in the working mode and as the buffer of the at least one of the auxiliary processing unit 530 when at least one of the cores of the CPU 1 510 or CPU 2 520 enters the sleep mode.

Figure 6:
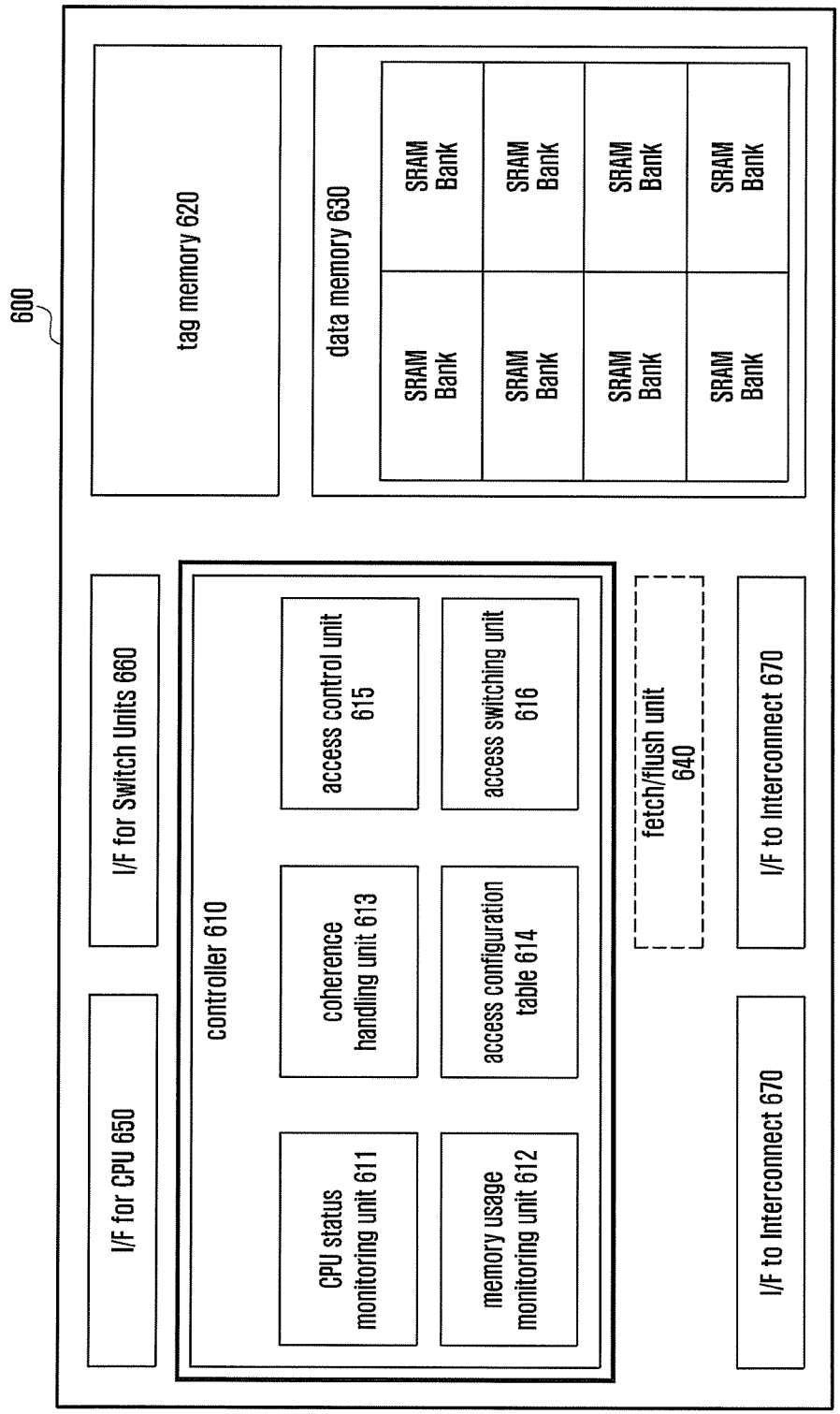
FIG. 6 is a block diagram illustrating a configuration of a sharable cache memory according to an embodiment of the present disclosure.

FIG. 6 is a block diagram illustrating a configuration of the sharable cache memory according to an embodiment of the present disclosure.

As shown in FIG. 6, the sharable cache memory 600 includes a controller 610, a tag memory 620, a data memory 630, a fetch/flush unit 640, and a plurality of interfaces 650 to 670.

The controller 610 checks when at least one of the cores of the CPU connected to the sharable cache memory enters the sleep mode, at least one bank to which the corresponding core is allocated among the banks inside the data memory 630. The controller 610 switches the at least one checked bank from the cache memory region for the at least one core of the CPU to the buffer region for low power operation of the auxiliary device.

The tag memory 620 is responsible for the caching operation of the CPU connected to the sharable cache memory 600 and stores tags for access to the data memory 630.

The data memory 630 includes a plurality of banks for use as cache memory of the CPU connected to the sharable cache memory or buffers of the auxiliary processing unit connected to the sharable cache memory 600. Examples of the data memory 630 include an SRAM.

The fetch/flush unit 640 performs fetching or flushing operation under the control of the controller 610 when a bank of the data memory 630 is switched from cache memory to buffer or vice versa.

The interfaces 650 to 670 includes a CPU interface 650 for connection of the CPU, a switch interface 660 for connection of switch units, and system interconnect interfaces 670 for connection of the system interconnect.

According to an embodiment of the present disclosure, the controller 610 includes a CPU status monitoring unit 611, a memory usage monitoring unit 612, a coherence handling unit 613, an access configuration table 614, an access control unit 615, and an access switching unit 616.

The CPU status monitoring unit 611 monitors to detect whether the CPU connected to the sharable cache memory 600 enters the standby mode. For example, the CPU status monitoring unit 611 detects whether at least one of the cores inside the CPU connected to the sharable cache memory 600 enters the sleep mode. The CPU monitoring unit 611 further monitor to detect whether the core switched to the sleep mode maintains the use of the cache memory.

Table 1 shows an exemplary CPU status monitoring result of the CPU status monitoring unit 611 about at least one of the cores inside the CPU.

TABLE 1

| Core ID | Status | L1 cache use status |
| --- | --- | --- |
| 0 | 0 (working) | 1 (use) |
| 1 | 0 (working) | 1 (use) |
| 2 | 1 (sleep) | 0 (non-use) |
| 3 | 1 (sleep) | 0 (non-use) |

If the CPU status monitoring unit 611 checks at least one core in the working/sleep mode within the CPU, the access control unit 615 uses the check result in calculating a size of buffer capable of being allocated in the data memory 630. For example, if the L1 cache implemented in the CPU connected to a layer higher than the sharable cache memory 600 is in use, the corresponding core can wake up in short time and, in this case, the access control unit 615 is capable of reducing the time for switching to buffer.

The memory usage monitoring unit 612 performs monitoring to collect the information on the use of the data memory 630 to determine the bank to allocate as a buffer among the banks of the data memory 630. For example, the memory usage monitoring unit 612 monitors to detect cache miss of each bank and bank allocation per CPU core.

The coherence handling unit 613 maintains coherence among the CPU, auxiliary processing unit, and sharable cache memory 600. For example, if a bank is switched from cache memory to buffer (or vice versa) in the data memory 630, a flush operation performs on the corresponding cache line. The coherence handling unit 613 performs invalidation on the cache line to flush selectively. The selection criteria are the access rate to the sharable address region of the corresponding bank (shareable access rate). If the access rate to the sharable address region is high, the coherence handling unit 613 performs invalidation such that the transaction occurring at other auxiliary devices since then is processed in the shared cache memory 600. Otherwise if the access rate to the sharable address region is low, the coherence handling unit 613 skips invalidation operation and transfer the transaction occurring since then to the CPU. This is because the increase of transactions occurring at other auxiliary processing units causes CPU overload. The access rate to the sharable address region is determined based on the monitoring result of the memory usage monitoring unit 612.

The access configuration table 614 stores a table defining the access regions for respective lower power operation scenarios to be handled by at least one auxiliary processing unit.

Table 2 shows an exemplary access configuration table 614. The access configuration table 614 consists of columns of the auxiliary processing unit ID, access ID corresponding to the event occurring at the auxiliary processing unit, address information of data memory to be allocated as buffer (e.g. start address and address offset), priority of event, and information on whether the event is allocated buffer (usage). Accordingly, the sharable cache memory 600 configures the access cases corresponding to at least one event of the at least one auxiliary processing unit. In the case that the total buffer size to be used for low power operation is larger than the size that can be allocated as buffer in the data memory (e.g. threshold size), the access control unit 615 excludes the event with low priority. The priority is determined dynamically through user option or configurations. The address corresponding to the currently configured event is marked as in use and, if extra address allocation is required for additional events, the currently used buffer size can be referenced.

ing the data memory 630 with the checked tags. In the case where the sharable cache memory 600 operates as buffer for the transaction of the auxiliary processing unit other than the CPU, however, the access switching unit 616 checks the intended bank based on the access configuration table 614 and derive an index and way number from the offset of the request address to access the real data in the checked bank. In this way, it is possible to access the cache memory immediately without a tag matching process to acquire the requested data.

Index=(Offset/Line Size) Mod nSet

Way=(Offset/Line Size)/nSet

Figure 8:
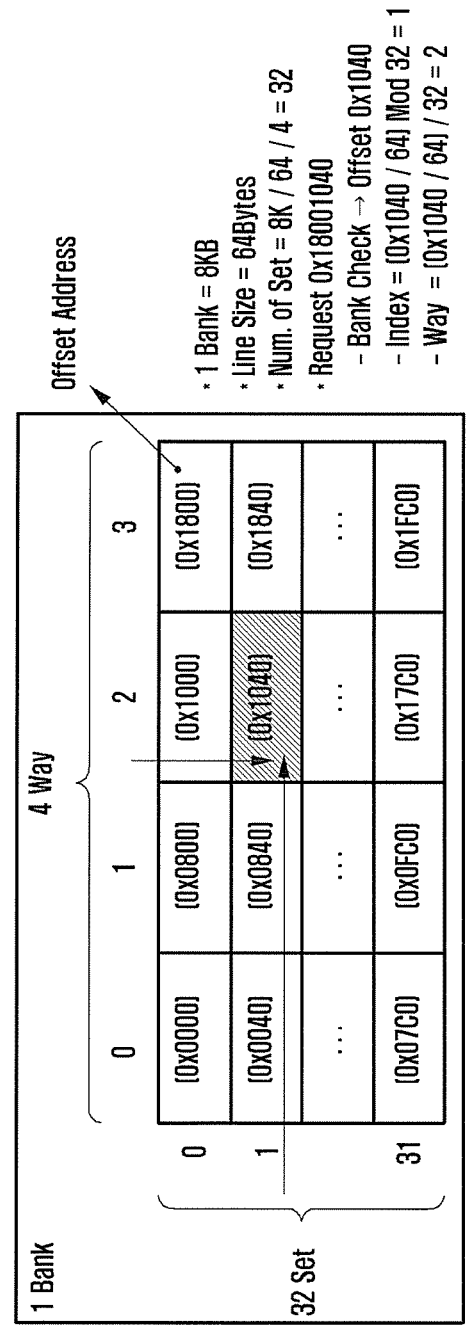
FIG. 8 is a diagram illustrating an exemplary data memory access operation of auxiliary processing units according to an embodiment of the present disclosure.

The access control unit 615 accesses the data memory using the derived index and way number. FIG. 8 shows an exemplary data memory access method using the address offset.

Figure 9:
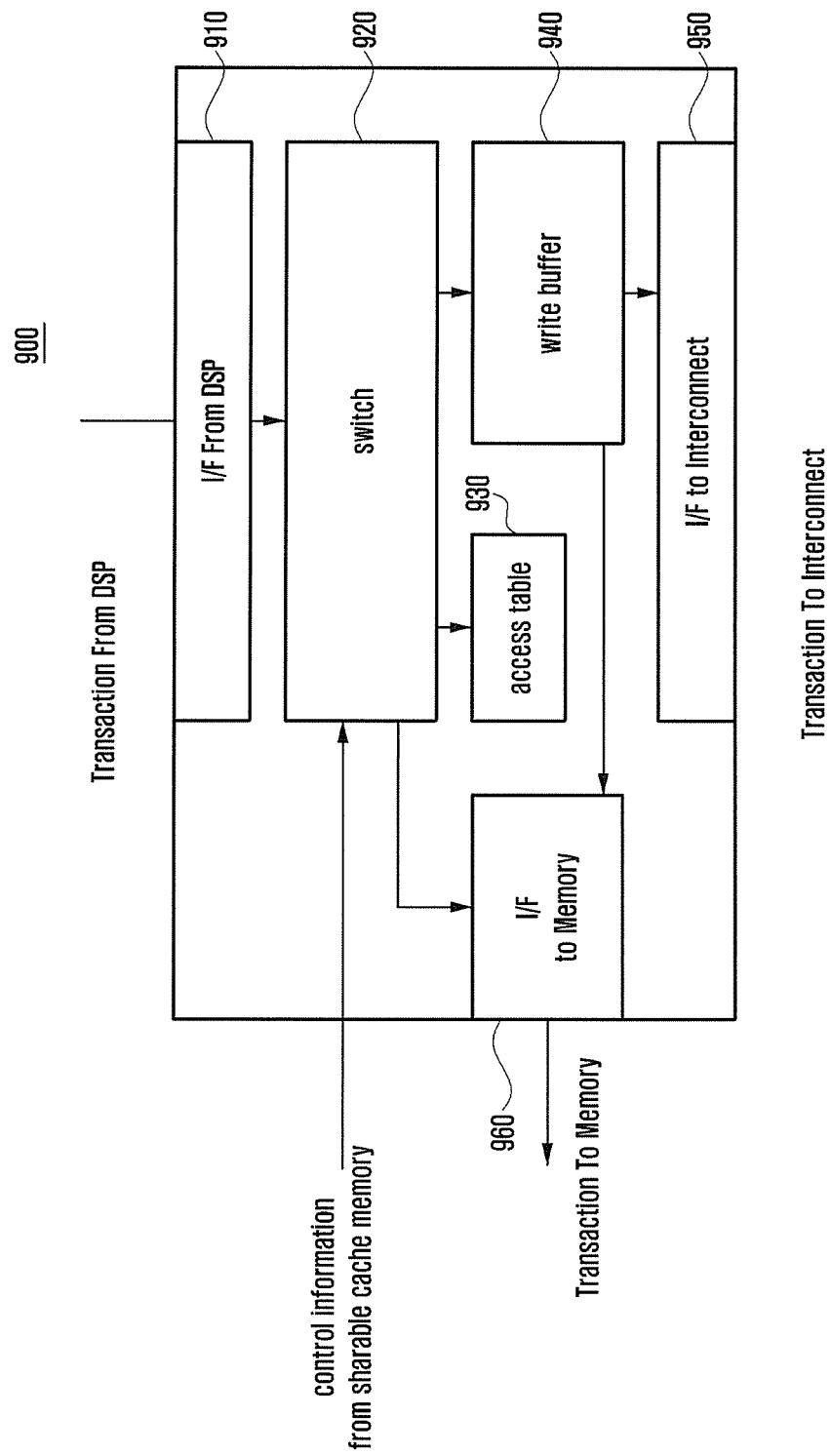
FIG. 9 is a block diagram illustrating a configuration of a switch unit according to an embodiment of the present disclosure.

FIG. 9 is a block diagram illustrating a configuration of the switch unit according to an embodiment of the present disclosure. Although FIG. 9 is directed to a case of the switch unit connected to a DSP, as will be understood by those skilled in the art that all of the switches connected to the respective auxiliary processing units according to an embodiment of the present disclosure is practiced in a similar manner.

According to an embodiment of the present disclosure, the switch unit 900 be controlled to transfer the transaction related to the event occurring at the DSP to the interconnecting unit connected to the main storage device (e.g., DRAM) or to the sharable cache memory based on the control infatuation from the sharable cache memory. That is, it is possible to access the DRAM or the data memory inside the sharable cache memory based on the control information from the sharable cache memory.

The switch unit 900 includes a plurality of interfaces 910, 950, and 960, a switch 920, an access table 930, and a write buffer 940.

The interfaces 910, 950, and 960 include a DSP connection interface 910, an interconnect connection interface 950, and a sharable cache memory connection interface 960.

TABLE 2

| Aux. processing device ID | Access ID | Start address | Address offset | Priority | Use |
| --- | --- | --- | --- | --- | --- |
| 0 (DSP) | 0 (voice recognition) | 0x18000000 | 0x200000 | 0 | 0 (off) |
| 0 (DSP) | 1 (message notification) | 0x18200000 | 0x200000 | 1 | 1 (on) |
| 1 (sensor hub) | 0 (sensing mode) | 0x19000000 | 0x100000 | 0 | 0 (off) |

The access control unit 615 determines whether the sharable cache memory 600 of at least one auxiliary processing unit is used based on the information collected from other components. The access control unit 615 determines the position to be allocated as buffer in the data memory 630. The access control unit 615 informs whether it is possible to use the sharable cache memory 600 for the at least one auxiliary processing unit.

The access switching unit 616 switches a request address to a cache access to make it possible to access the data memory 630 when at least one auxiliary processing unit accesses the sharable cache memory.

Figure 7:
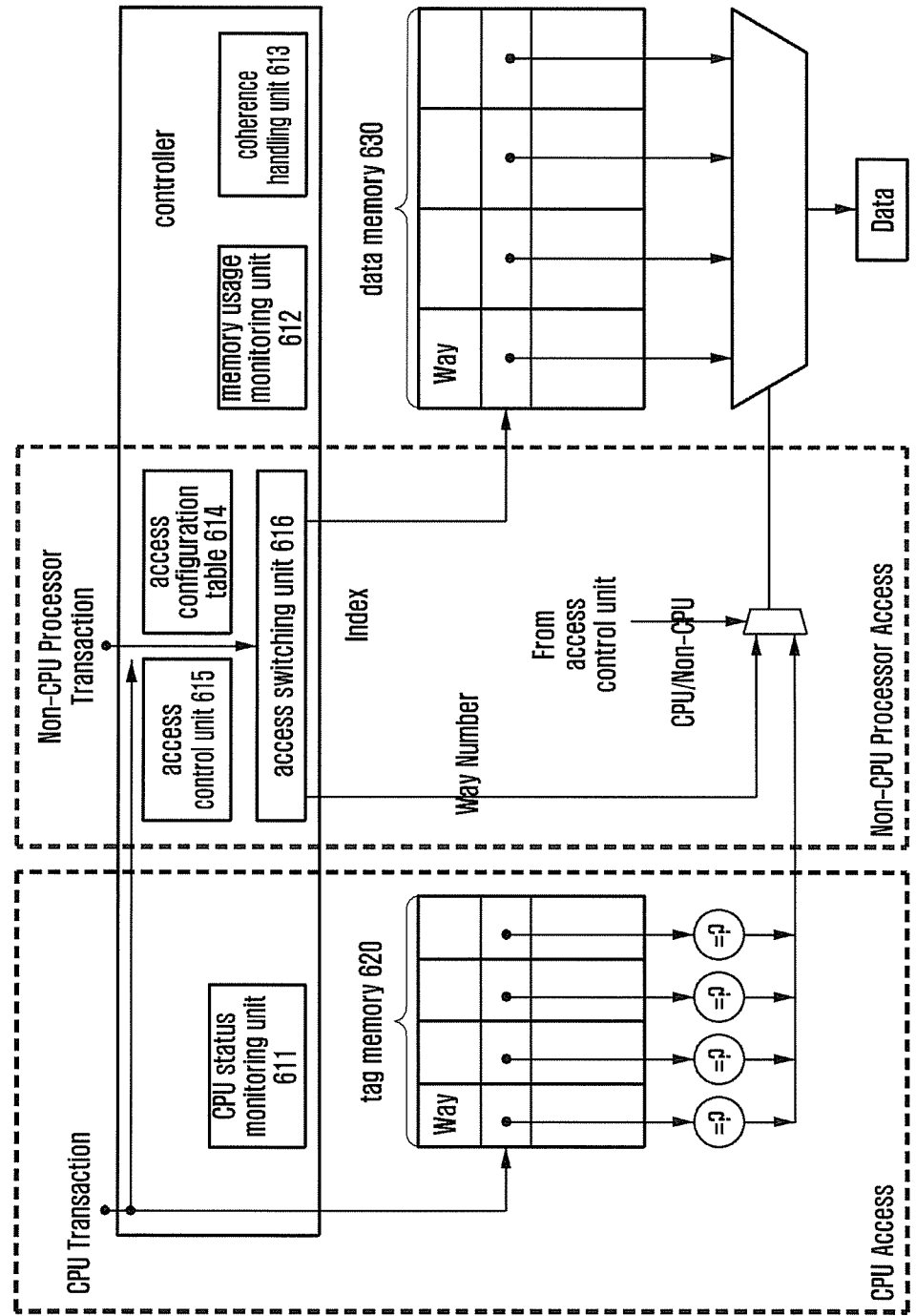
FIG. 7 is a diagram illustrating an exemplary sharable cache memory access operation of a CPU and auxiliary processing units according to an embodiment of the present disclosure.

Referring to FIG. 7, the sharable cache memory 600 operates as cache memory for the transaction of the CPU in such a way of checking the tags by accessing the tag memory 620 like the conventional method and then access- The switch 920 is controlled so as to transfer the transaction related to the event occurring at the DSP to the interconnect connection interface 950 or the sharable cache memory connection interface 960. For example, if the sharable cache memory transmits preparation complete information, the switch 920 establishes a path so as to access the access ID region designated by the sharable cache memory as the sharable cache memory. Once the path has been established, the path is maintained until the preparation complete information becomes invalid or reconfigured.

The access table 930 stores the information for designating an access address to the sharable cache memory which corresponds to the access ID received from the sharable cache memory. Table 3 shows an exemplary access table 930

TABLE 3

| Access ID | Start address | Address offset |
| --- | --- | --- |
| 0 (voice recognition) | 0x18000000 | 0x200000 |
| 1 (message notification) | 0x18200000 | 0x200000 |

Table 3 shows an exemplary case of configuring an address for use the sharable cache memory as a buffer when a voice recognition event or message notification event occurs. If the sharable cache memory transmits an access ID adaptive to the situation, the DSP accesses the sharable cache memory for the transaction of the corresponding event. It is preferred that the access ID, start address, and address offset of table 3 match the values in the access configuration table 614 like table 2. The switch unit 900 does not store the access table 930 depending on the case and, in this case, the switch unit 900 references the start address and address offset as well as the access ID that are received from the sharable cache memory.

Figure 10:
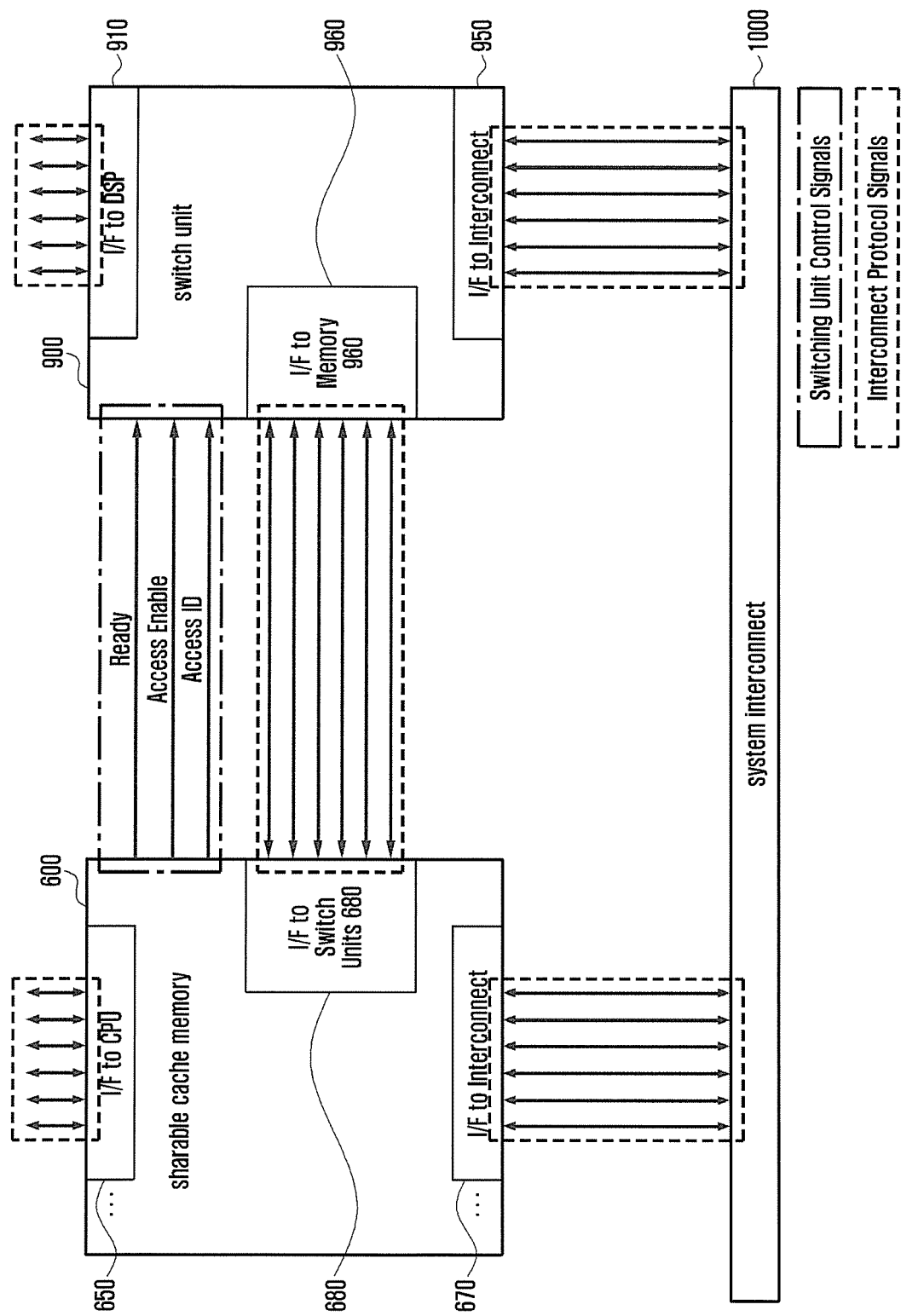
FIG. 10 is a diagram illustrating signal flows in an electronic device according to an embodiment of the present disclosure.

FIG. 10 is a diagram illustrating signal flows in the electronic device according to an embodiment of the present disclosure.

The sharable cache memory 600 exchanges interconnect protocol signals with at least one switch unit 900 and system interconnecting unit 1000. Accordingly, the sharable cache memory 600 includes a CPU connection interface 650, at least one switch unit connection interface 680, and a system interconnect connection interface 670.

The switch unit 900 exchanges interconnect protocol signals with the auxiliary processing unit (e.g., DSP), sharable cache memory 600, and system interconnect 1000. Accordingly, the switch unit 900 includes an auxiliary processing (e.g. DPS) connection interface 910, a sharable memory connection interface 960, and a system interconnect connection interface 950.

According to an embodiment of the present disclosure, the sharable cache memory 600 transmits control information for switching the transaction from the auxiliary processing unit of the corresponding switch unit 900 between access paths. The control information include preparation complete information for indicating the completion of the preparation for use of the region allocated as a buffer in the sharable cache memory, access enable information for indicating that the auxiliary processing unit can allocate a buffer in the sharable cache memory, and the access ID information.

Figure 11:
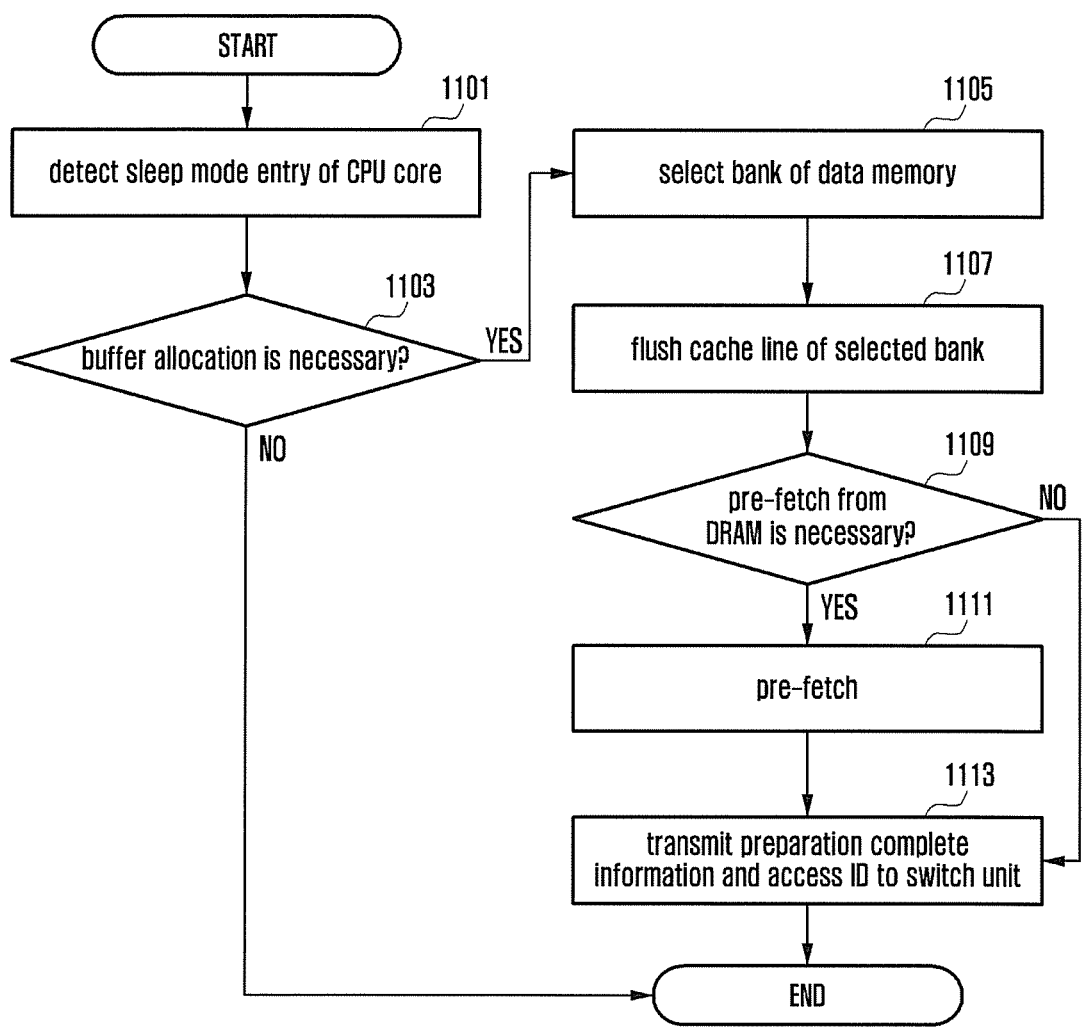
FIG. 11 is a flowchart illustrating a sharable cache memory control method of a sharable cache memory controller, when a CPU enters a standby mode, according to an embodiment of the present disclosure.

FIG. 11 is a flowchart illustrating a sharable cache memory control method of a sharable cache memory controller, when the CPU enters the standby mode, according to an embodiment of the present disclosure.

The controller 610 uses the sharable cache memory 600 as the cache memory for the CPU which is in the working mode. The controller 610 detects that at least one core of the CPU enters the sleep mode at step 1101. The data memory 630 which the core in the sleep mode has used not be used until the CPU wakes up. According to an embodiment of the present disclosure, it is possible to switch the core from the sleep mode to a deep sleep mode so as not to use even the L1 cache. In this way, after at least one core of the CPU has been switched to the sleep mode or deep sleep mode, the controller 610 determines whether it is necessary to allocate the data memory 630 as a buffer of the auxiliary device at step 1103.

If it is necessary to use the data memory 630 as the buffer, the controller 610 selects a bank of the data memory at step 1105. For example, the controller 610 selects a bank with high allocation weight of the core switched to the sleep mode. The controller 610 flushes the cache line of the selected bank at step 1107. The controller 610 also determines whether pre-fetch from the DRAM is necessary at step 1109 and, if so, perform pre-fetch operation at step 1111.

Next, the controller 610 transmits the preparation complete information and access ID information to the switch unit connected to the auxiliary processing unit at step 1113. Accordingly, the switch unit of the corresponding auxiliary processing unit is aware that the sharable cache memory 600 can be used as a buffer.

Figure 12:
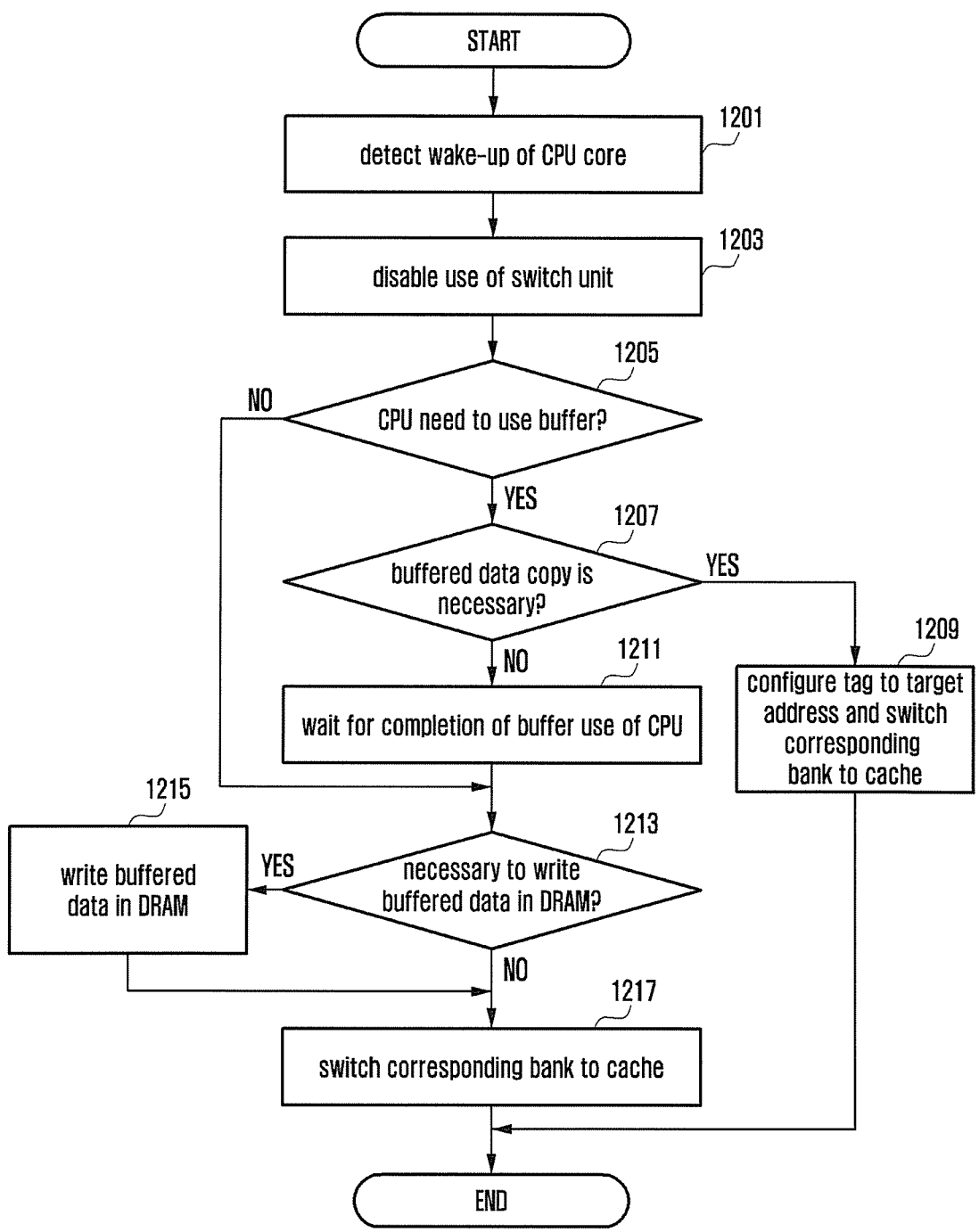
FIG. 12 is a flowchart illustrating a sharable cache memory control method of a sharable cache memory controller, when a CPU wakes up, according to an embodiment of the present disclosure.

FIG. 12 is a flowchart illustrating a sharable cache memory control method of the sharable cache memory controller, when the CPU wakes up, according to an embodiment of the present disclosure.

The controller 610 detects that a core wakes up from the sleep mode at step 1201. If the core wakes up from the sleep mode, the controller 610 deactivates the switch unit, i.e. the controller 610 disables the access to the data memory 630 of the sharable cache memory 600, at step 1203. If the core wakes up from the sleep mode, the CPU needs more cache memory. The controller 610 determines whether the CPU core has to process the data in the region allocated as a buffer in the sleep mode at step 1205. If the CPU core has to process the data, the data is maintained in the buffer region until the process completes. For example, the CPU core reads the mobility information, which the sensor hub has sensed during a predetermined period and stored in the data memory 630 of the sharable cache memory, to calculate the movement distance or arrival time for use in an application.

The controller 610 determines whether it is necessary to copy the data from the region allocated as the buffer at step 1207 and, if so, configures a tag to the target address and switches the corresponding bank to the cache memory at step 1209 and, otherwise, waits until the CPU core completes processing the data at step 1211. Afterward, the controller 610 determines whether it is necessary to write the buffered data into the DRAM at step 1213 and, if so, controls to write the data into the DRAM at step 1215 and, otherwise, switches the corresponding bank to the cache memory at step 1217.

Figure 13:
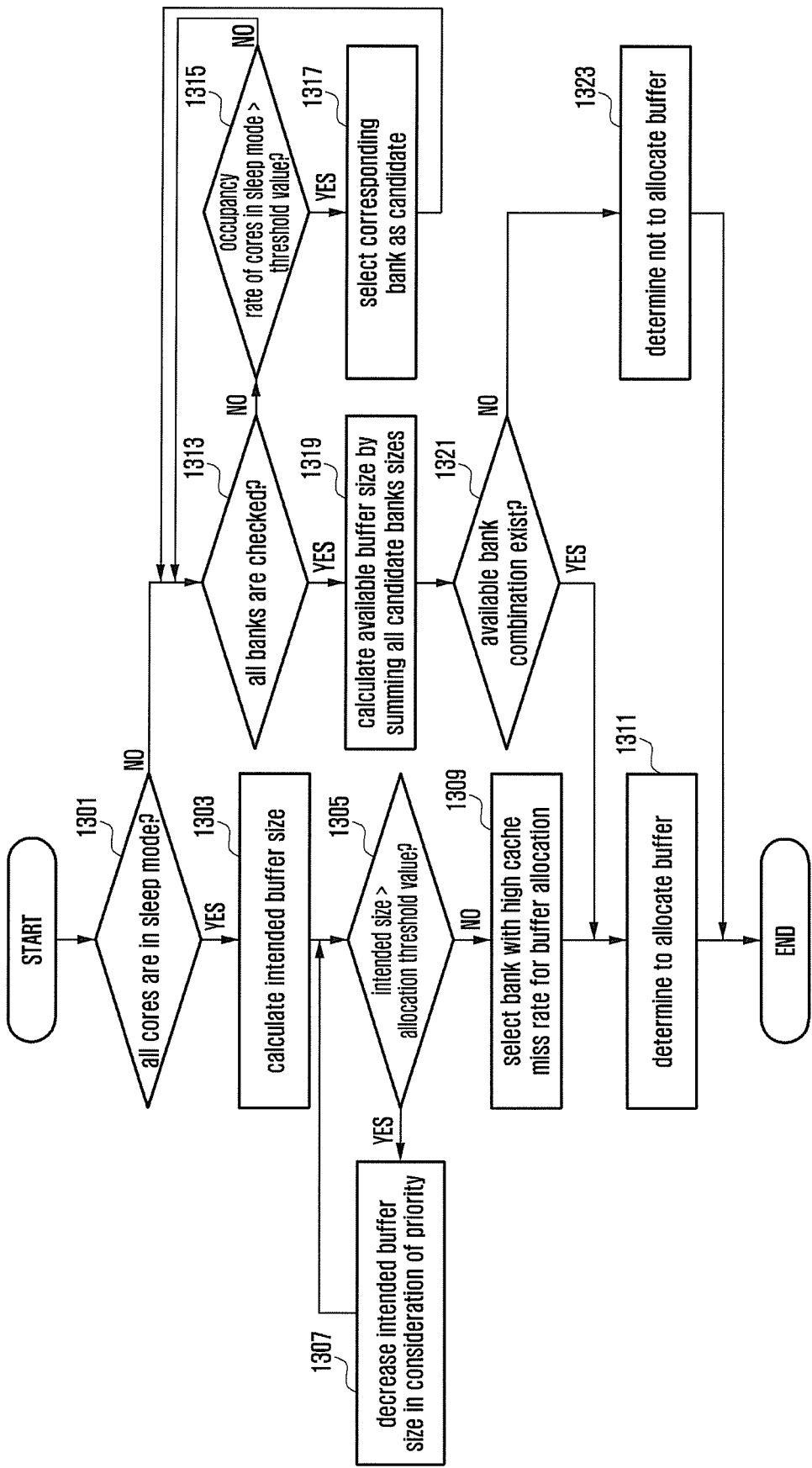
FIG. 13 is a flowchart illustrating a method for allocating a buffer region in a sharable cache memory by means of a controller of the sharable cache memory according to an embodiment of the present disclosure.

FIG. 13 is a flowchart illustrating a method for allocating a buffer region in the sharable cache memory by means of the controller of the sharable cache memory according to an embodiment of the present disclosure.

The controller 610 performs the functions of determining allocation of a buffer to the data memory bank of the sharable cache memory, size of region to allocate, and the allocation-target bank. In the case of a quad-core CPU, if two cores are working even though the other two cores are in the sleep mode, this means that the DRAM as the main storage device is working and thus it is difficult to expect power conservation effect through DRAM access reduction with the use of the buffers for some auxiliary processing unit. On the contrary, if the data memory 630 which is in use for the cache memory of the CPU in the working mode is allocated as a buffer, this cause performance degradation of the CPU. Thus the controller 610 has to makes an appropriate decision to improve the low power consumption effect while decreasing the impact to the CPU in the working mode. For example, the controller 610 makes a buffer allocation decision and bank selection decision based on the software (S/W) event information, hardware (H/W) event information, cache monitoring information, and access configuration information from the CPU.

Referring to FIG. 13, the controller 610 determines whether all CPU cores are in the sleep mode at step 1301.

If all the CPU cores are in the sleep mode, the controller 610 calculates a buffer size as intended at step 1303. The controller 610 calculates the sizes appropriate for all low power scenarios designated for use in the range allowed by the size of the data memory 630. For example, the use of the functionalities of the auxiliary processing units such as the DSP, sensor hub, GPS unit, and Bluetooth unit is checked by S/W. This is because the on/off option of the corresponding function is provided on the S/W platform. If the on/off state of a function is informed to the controller 610, the controller 610 marks the state in the access configuration table 614 for use in determining the buffer region allocation size. The controller 610 determines whether the calculated buffer size is greater than an allocation threshold value at step 1305 and, if so, adjusts the buffer size to be equal to or less than the threshold value in a way of reducing the buffer size in consideration of the priorities of the functions at step 1307. The buffer size is adjusted to be equal to or less than the threshold value to avoid performance degradation of the CPU when the CPU wakes up. It is possible to improve the utilization efficiency of the controller 610 by increasing the priority of the frequently used function. The change of the priority is reflected to the access configuration table 614. The controller 610 selects a bank with relatively high cache miss rate among the banks in the data memory 630 for buffer allocation at step 1309. The controller 610 makes a decision of allocating a buffer region to the corresponding bank at step 1311. The controller 610 switches the region necessary for the event scenario of the auxiliary processing unit as the buffer region in the corresponding bank.

If not all the CPU cores are in the sleep mode, i.e. if some cores are in the sleep mode, the controller 610 determines whether all banks are checked for buffer region allocation at step 1313 and, if not, determines whether the occupancy rate of the cores in the sleep mode per bank is greater than a threshold value at step 1315 and, if the occupancy rate is greater than the threshold value, selects the corresponding bank as a candidate at step 1317. This is because if the corresponding banks are switched to buffers it is possible to decrease the impact to the CPU core which uses the data memory 630 as the cache memory as compared to the case of switching other banks. The threshold value is set to a different value depending on whether the CPU core is in the sleep mode or deep sleep mode. If the core is not in the deep sleep mode, it is possible to avoid performance degradation of the corresponding CPU core when the CPU core wakes up by setting the threshold to a relatively high value.

If all the banks are checked, the controller 610 calculates the available buffer size by summing the sizes of all candidate banks at step 1319. Next, the controller 610 determines whether there is any combination of candidate banks which is available for the region necessary for the event scenario of the auxiliary processing unit at step 1321. If there is no available combination, the controller 610 determines not to allocate any buffer region at step 1323. That is, the controller 610 can perform buffer allocation only when there is any scenario applicable to the total size of the candidate banks for which the occupancy rate of the cores in the sleep mode is greater than the threshold value. If there is any available combination, the controller 610 determines to allocate a buffer region to the corresponding bank at step 1311. The controller 610 switches the region necessary for the event scenario of the auxiliary processing unit to the buffer region in the corresponding bank.

According to an embodiment of the present disclosure, the CPU uses Dynamic Voltage and Frequency Scaling (DVFS). If a CPU core enters the sleep state, the voltage and frequency drop. Using this information, the controller 610 determines whether the CPU core is in the sleep state and the deep sleep state. The voltage and frequency are maintained at low levels and, at this time, the L1 cache can be maintained wholly. In the deep sleep state, however, the L1 cache does not maintained because the clock and power are gated. Through this distinction, it is possible to determine whether to allocate the cache region which has been mainly used by the core entered the sleep state as the buffer wholly or partially.

The memory utilization monitoring of the controller 610 is a function installed for performance monitoring of the data memory 630. Since the controller 610 performs the per-bank miss and allocation monitoring because the controller 610 determines the target for allocating the buffer region among the banks of the data memory 630.

Table 4 shows exemplary information necessary for the controller 610 to make a buffer region allocation decision. Depending on the implementation, the controller 610 uses some of this information.

TABLE 4

| Classification | Information | Usage |
| --- | --- | --- |
| CPU S/W | Use function, priority | Determine low power scenario candidate for use of sharable cache memory |
| CPU H/W | CPU sleep state, DVFS | Determine bank to be used as buffer |
| Memory usage monitoring | Occupancy rate per bank core | Determine buffer allocation bank for part of CPU cores in sleep mode |
| | Missing rate bank | Determine buffer allocation bank for all of CPU cores in sleep mode |
| Access configuration table | Necessary buffer size per lower power operation scenario | Determine scenario appropriate for securable buffer size |

According to an embodiment of the present disclosure, the controller 610 determines the buffer region allocation size according to the following conditions.

i) Part of CPU cores are in sleep mode

Allocation threshold≥[secured] sum of banks of which sizes exceed occupancy threshold of cores in sleep mode≥ [allocation] sum of sizes necessary for available low power operation scenarios ii) All of CPU cores are in sleep mode Allocation threshold value≥[secured] sum of banks of which sizes do not exceed allocation threshold value among banks with high miss rate≥[allocation] sum of sizes necessary for available low power operation scenarios The controller 610 allocates the buffer region selected with a securable size for available low power operation scenario.

Figure 14:
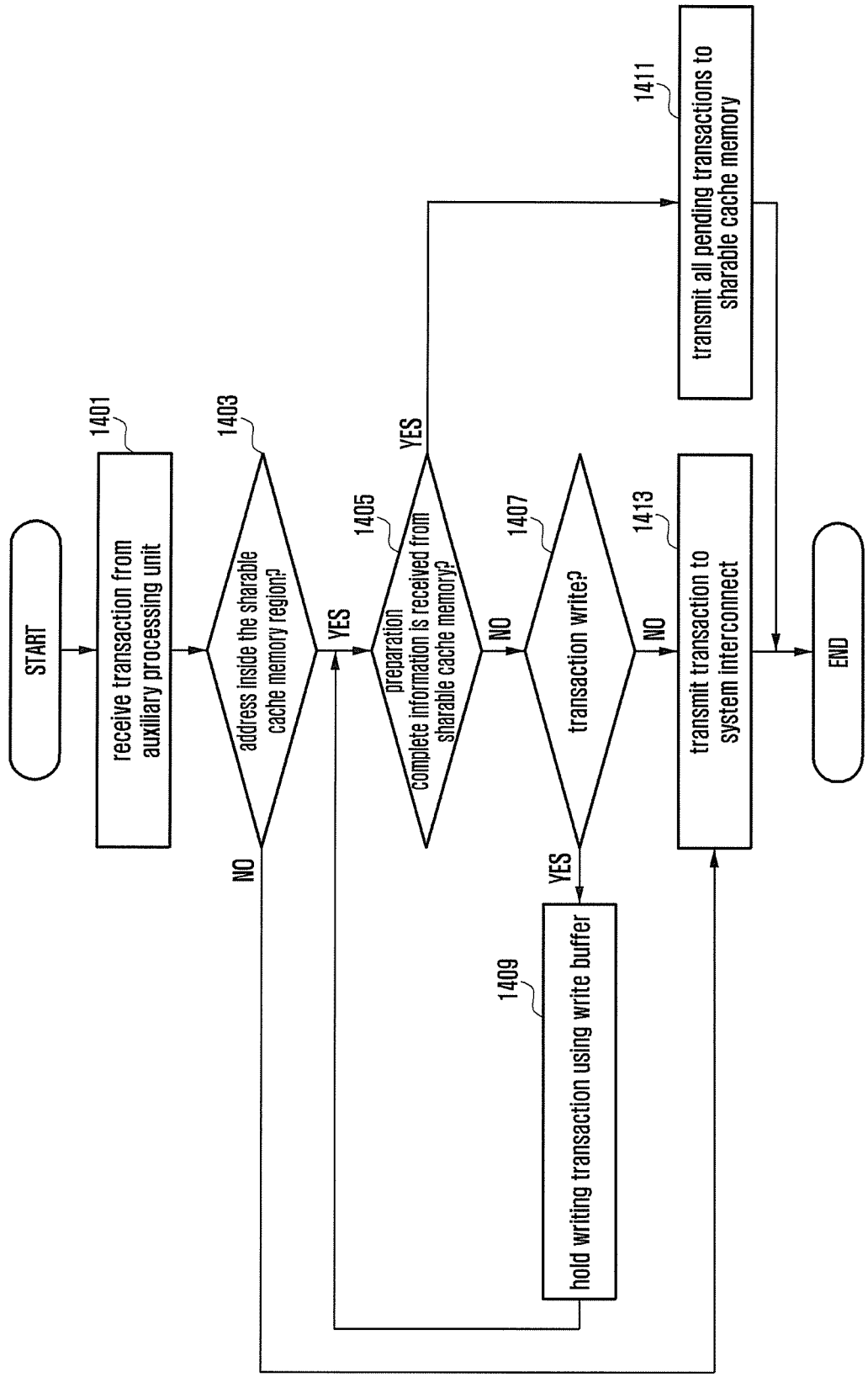
FIG. 14 is a flowchart illustrating the operation of a switch unit according to an embodiment of the present disclosure.

FIG. 14 is a flowchart illustrating the operation of the switch unit according to an embodiment of the present disclosure.

The switch unit 900 is responsible for switching the transaction occurring at an auxiliary processing unit to an appropriate path. The switch unit 900 receives the transaction occurring at the auxiliary processing unit at step 1401. The switch unit 900 determines whether a request address for the corresponding transaction exists in the sharable cache memory region at step 1403 and, if not, transfers the transaction to the system interconnecting at step 1413. In this case, the auxiliary processing unit accesses the DRAM. If the request address for the corresponding transaction exists in the sharable cache memory region at step 1403, the switch unit 900 determines whether preparation complete information is received from the sharable cache memory at step 1405. If a transaction write event occurs at step 1407 before receiving the preparation complete information, the switch unit 900 holds writing the transaction using a write buffer at step 1409. If the corresponding transaction is read again, the switch unit 900 controls reading the transaction from the write buffer. In the case of reading a certain transaction other than the corresponding transaction, the switch unit 900 reads the transaction with the DRAM. If the preparation complete information is received from the sharable cache memory, the switch unit 900 transfers all the pending write transactions to the sharable cache memory at step 1411. If no transaction write even occurs, the switch unit 900 transfers the corresponding transaction to the system interconnecting at step 1413.

Figure 15:
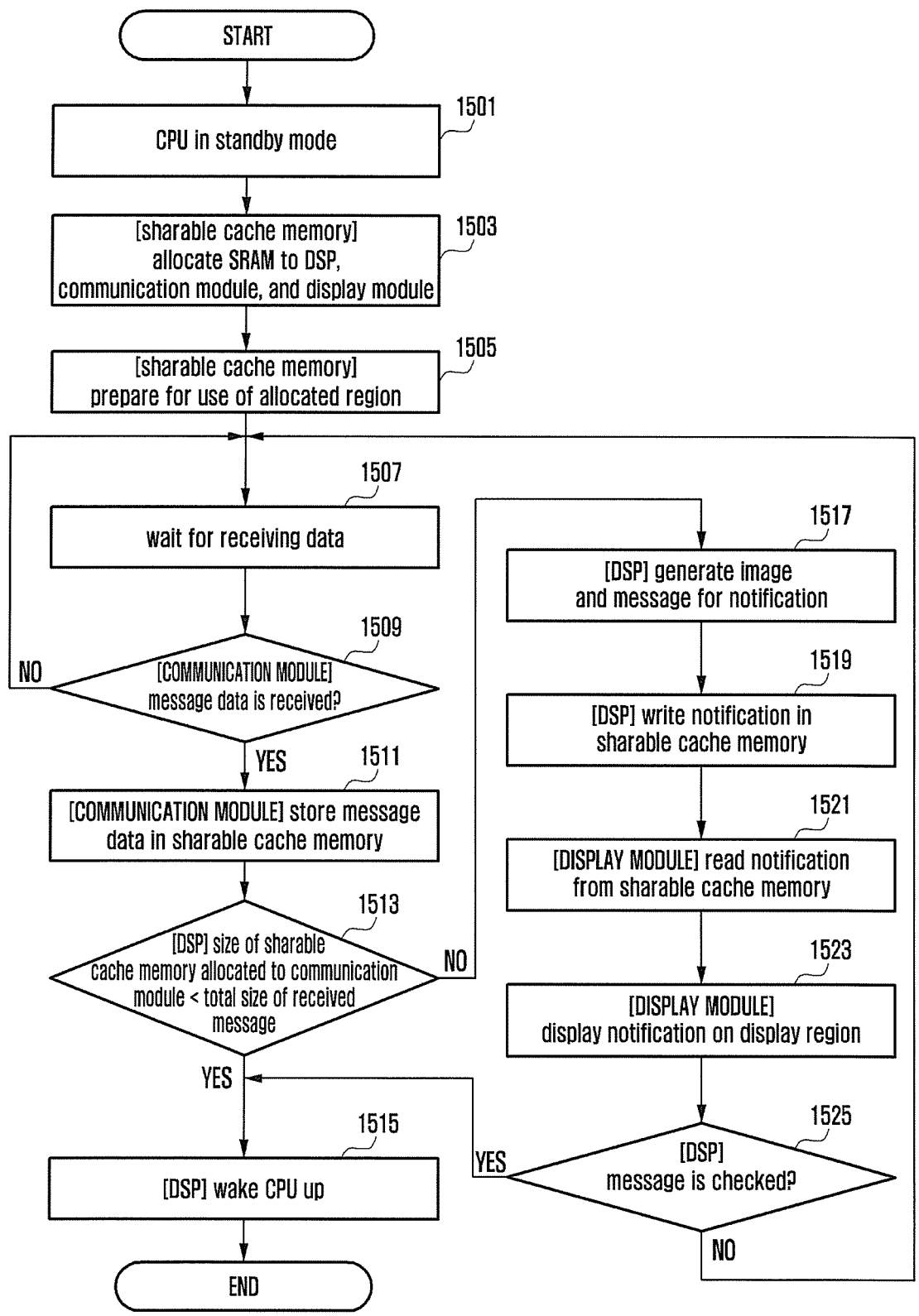
FIGS. 15 and 16 are flowcharts illustrating methods for an electronic device to process a notification received in a standby mode of a CPU according to various embodiments of the present disclosure.
Figure 16:
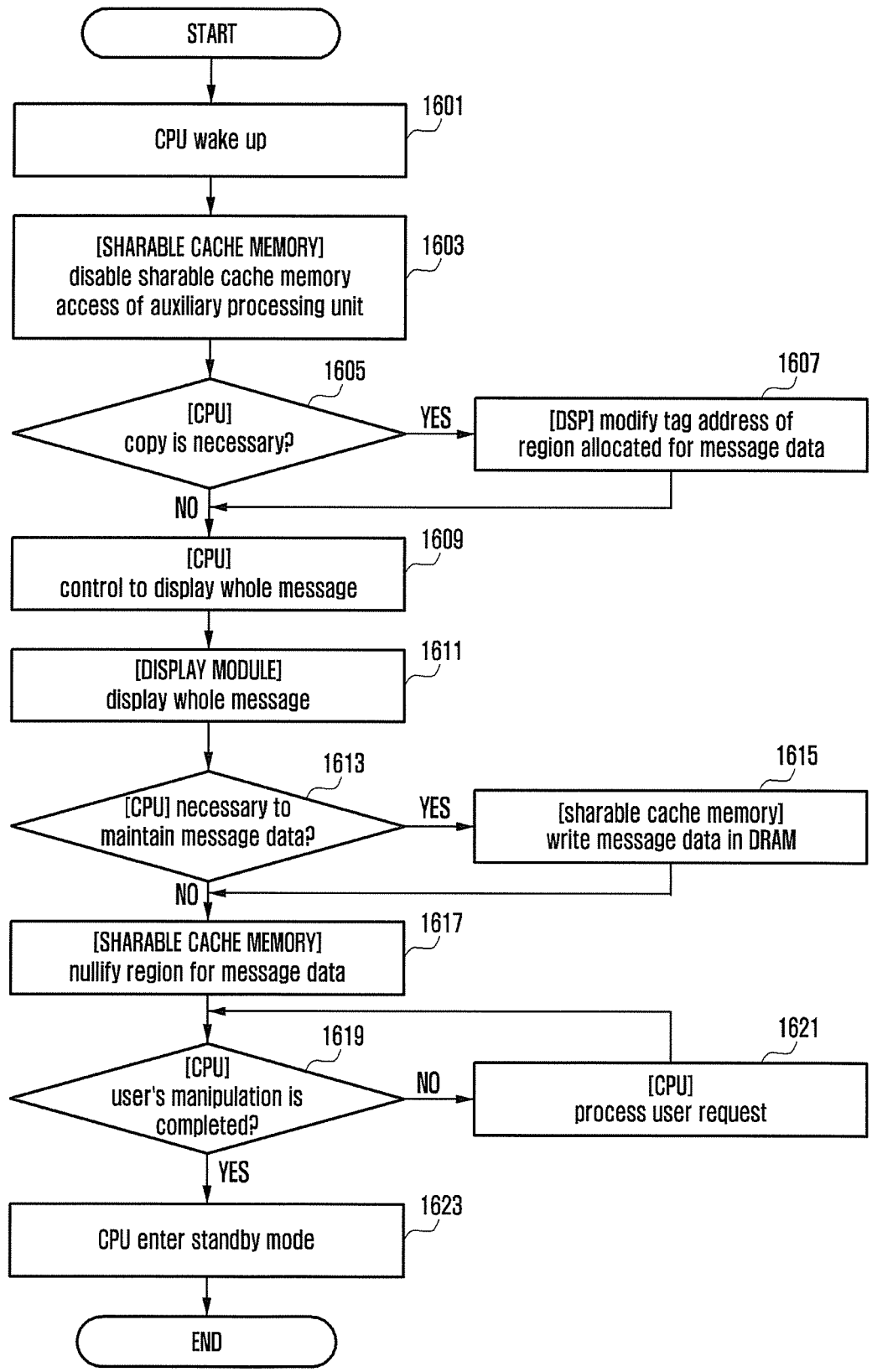

FIGS. 15 and 16 are flowcharts illustrating methods for an electronic device to process a notification received in the standby mode of the CPU according to various embodiments of the present disclosure.

The notification function is a function of presenting a notification of the receipt of a message on the user terminal, the message being received by means of the communication unit such as Bluetooth, Wi-Fi, and 4G communication units. According to an embodiment of the present disclosure, the notification be any of various application data such as email arrival notification, messenger application message notification, and push notification from a push server. The user manipulates the terminal to check the content of the original message after the notification is presented to the user. This method can be applied to all the types of mobile and wearable devices.

In this embodiment, if the terminal supports a partial display such as 'edge display', the DSP can process the event of the message receipt by means of the communication unit and display the processing result at a small designated region. At this time, the communication unit is a Bluetooth, Wi-Fi, or 4G communication unit. It will be understood by those skilled in the art that various types of auxiliary processors, as well as DSP, can be used as the auxiliary processing unit for processing the message received in the standby mode of the CPU.

Referring to FIG. 15, if the CPU enters the standby mode at step 1501, the sharable cache memory allocates data memory (e.g. SRAM) to the DSP, communication unit, and display unit, respectively among the auxiliary processing units at step 1503. The sharable cache memory completes preparation for use of the allocated data memory region and transmits the preparation complete information to the switch units connected to the DSP, communication unit, and display unit, respectively.

The electronic device waits for receiving data at step 1507. If the message data is received by the communication unit at step 1509, the electronic device writes the received message data in the data memory allocated to the communication unit in the sharable cache memory at step 1511. Afterward, the DSP determines whether the total size of the written message data is greater than the size of the data memory allocated to the communication unit at step 1513 and, if so, wakes the CPU up from the standby mode at step 1515. This makes it possible for the CPU to wake up, when the message data processing space runs short, to process the message data appropriately.

If the total size of the written message data is less than the size of the memory data allocated to the communication unit, the DSP processes the received message data and generates a notification image or message at step 1517. The DSP writes the generated notification into the data memory allocated to the DSP in the sharable cache memory at step 1519. The display unit reads the notification from the data memory at step 1521 and displays the read notification at a part of the display region at step 1523. If user's manipulation for checking the message related to the notification is detected at step 1525, the DSP wakes the CPU up at step 1515.

Referring to FIG. 16, the CPU wakes up at step 1601. For example, if the user pushes a button or touches the screen to turn on the terminal, the CPU wakes up. The sharable cache memory disables the sharable cache memory access of the auxiliary processing unit at step 1603. For example, the sharable cache memory disable the access enable information and transmit the result to the switch units connected to the DSP, communication unit, and display unit.

The CPU determines whether it is necessary to copy the message data buffered in the sharable cache memory to the CPU region at step 1605 and, if so depending on the application, adjusts the tag address of the region allocated for the message data at step 1607. The CPU processes the message data to display the whole message at step 1609, and the display unit displays the whole message at step 1611.

The CPU determines whether it is necessary to maintain the corresponding message data at step 1613 and, if so, the sharable cache memory writes the corresponding message data in the DRAM at step 1615. The sharable cache memory nullifies the region for the corresponding message data at step 1617. The CPU determines whether the user's manipulation has completed at step 1619 and, if the user's manipulation is detected continuously, processes the user request at step 1621. In this case, the region allocated as the buffer is switched to the cache memory for use by the CPU. If the user's manipulation has completed, the CPU enters the standby mode at step 1623.

Figure 17:
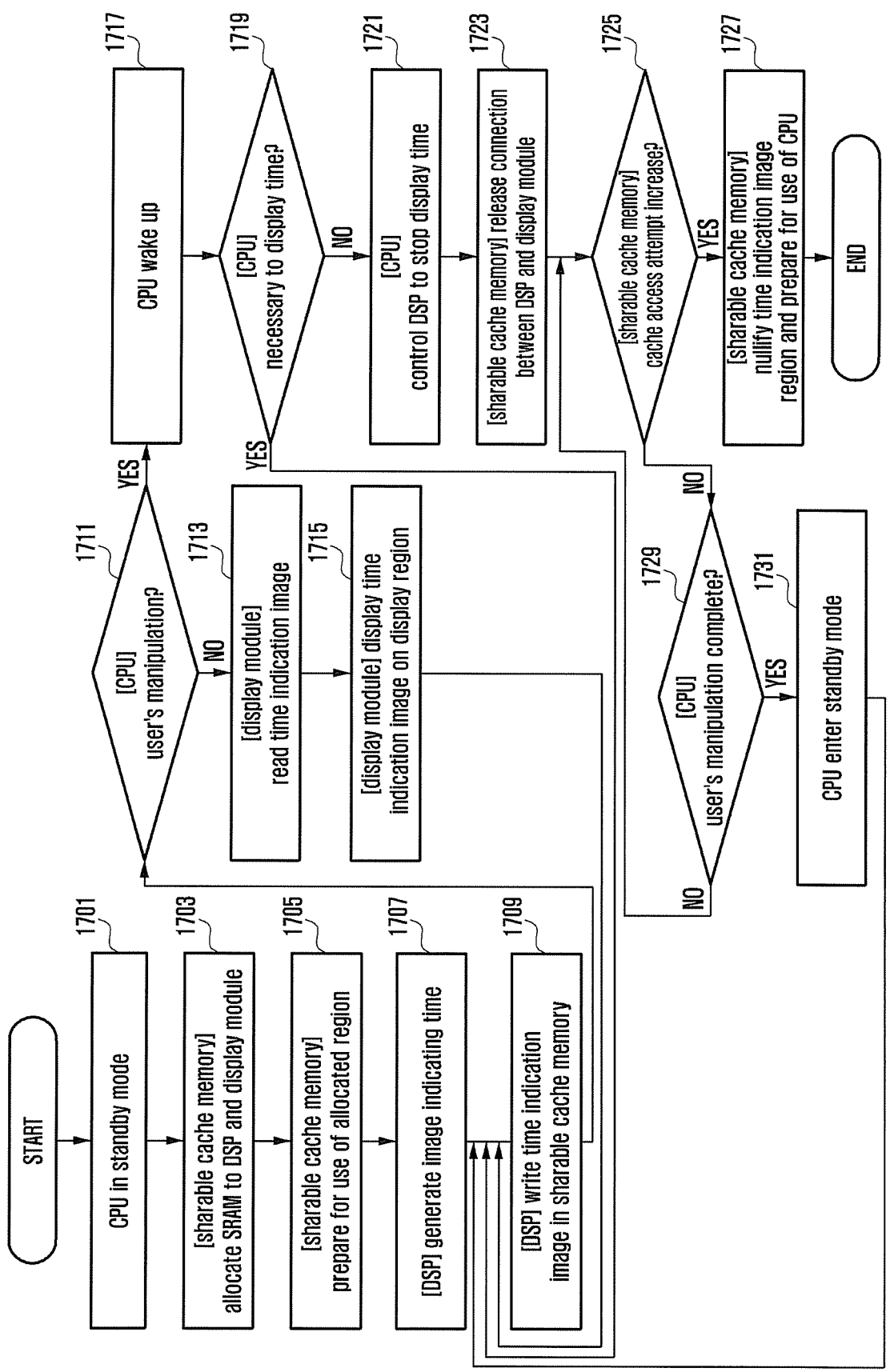
FIG. 17 is a flowchart illustrating a method for an electronic device to display time information in a standby mode of the CPU according to an embodiment of the present disclosure.

FIG. 17 is a flowchart illustrating a method for an electronic device to display time information in the standby mode of the CPU according to an embodiment of the present disclosure.

According to an embodiment of the present disclosure, the sharable cache memory management is applied to an always-on watch scenario in which a watch is displayed on the screen. For example, the DSP generates an image indicating the time such that the display unit displays the image on at least part of the screen. It will be understood by those skilled in the art that any of various types of auxiliary processors, as well as the CPU, can be used as the auxiliary processing unit for processing the time information in the standby mode of the CPU.

Referring to FIG. 17, the CPU enters the standby mode at step 1701 and then the sharable cache memory allocates data memory (e.g. SRAM) for the DSP and display unit among the auxiliary processing units at step 1703. The sharable cache memory completes preparation for use of the allocated data memory regions and transmits the preparation complete information to the switch units connected to the DSP and display unit at step 1705.

The DSP generates an image indicating the time at step 1707. The DSP writes the time indication image into the data memory allocated to the DSP in the sharable cache memory at step 1709. The DSP determines whether user's manipulation is detected at step 1711 and, if not, the display unit reads the time indication image at step 1713 and displays the read time indication image on at least part of the display area at step 1715. If no user's manipulation is detected, the electronic device displays an image indicating the current time through the above-described sequence.

Otherwise if any user's manipulation is detected, the CPU wakes up at step 1717. The CPU determines whether it is necessary to display the time at step 1719. If it is necessary to display the time, the DSP generates an image indicating the time at step 1707. If it is not necessary to display the time, the CPU controls the DSP to stop generating the time indication image at step 1721. Then the sharable cache memory releases the connection to the DSP and display unit at step 1723. That is, the sharable cache memory access of the DSP and display unit is disabled. The sharable cache memory determines whether the number of sharable cache memory access attempts of the CPU increases at step 1725 and, if so, nullifies the time indication image region in the data memory region and prepares for cache memory access of the CPU at step 1727. Otherwise if the number of sharable cache memory access attempts of the CPU does not increase, the CPU determines whether the user's manipulation has completed at step 1729 and, if so, enters the standby mode at step 1731.

Figure 18:
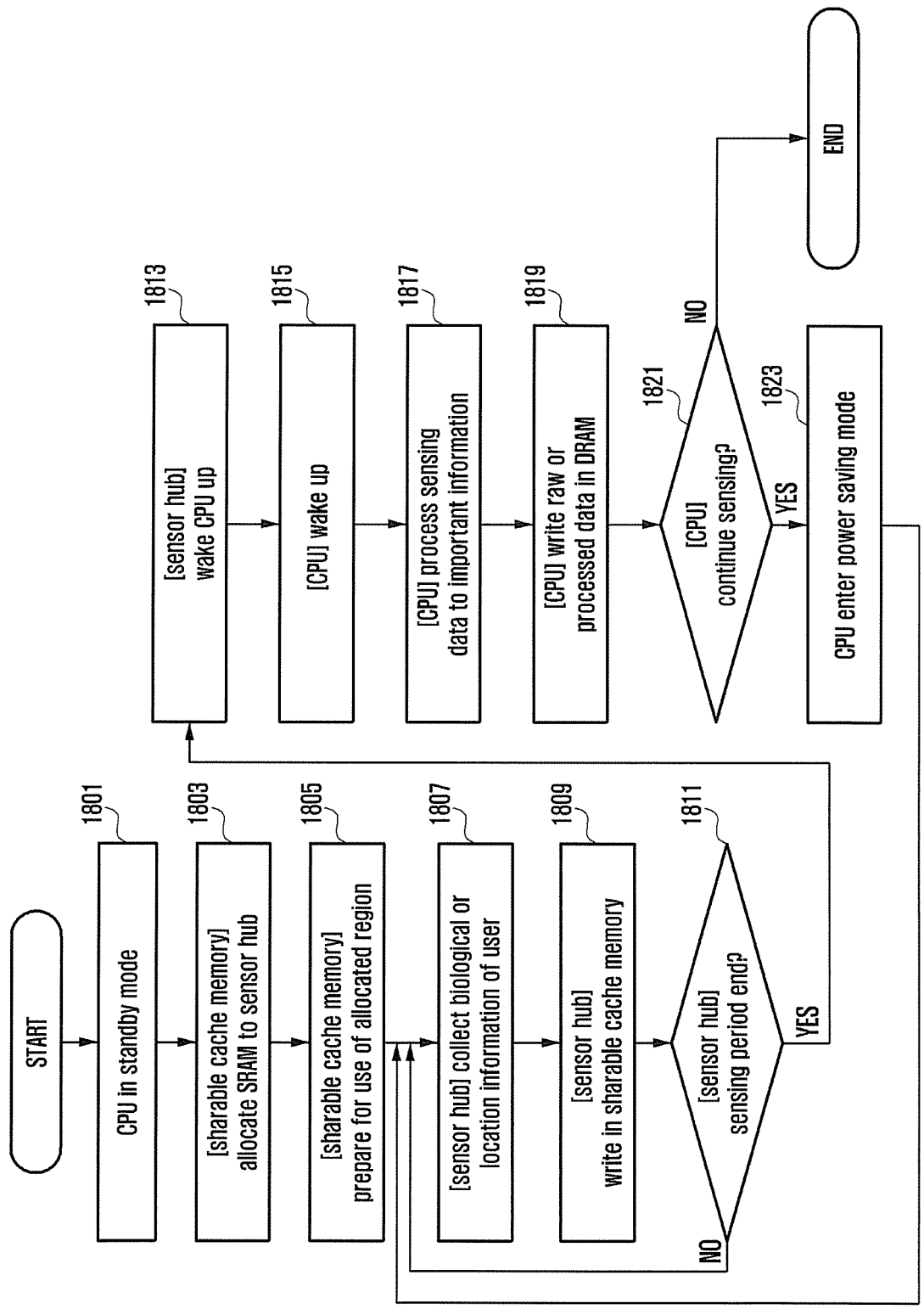
FIGS. 18 and 19 are flowcharts illustrating a method for an electronic device to process sensing data in a standby mode of the CPU according to various embodiments of the present disclosure.
Figure 19:
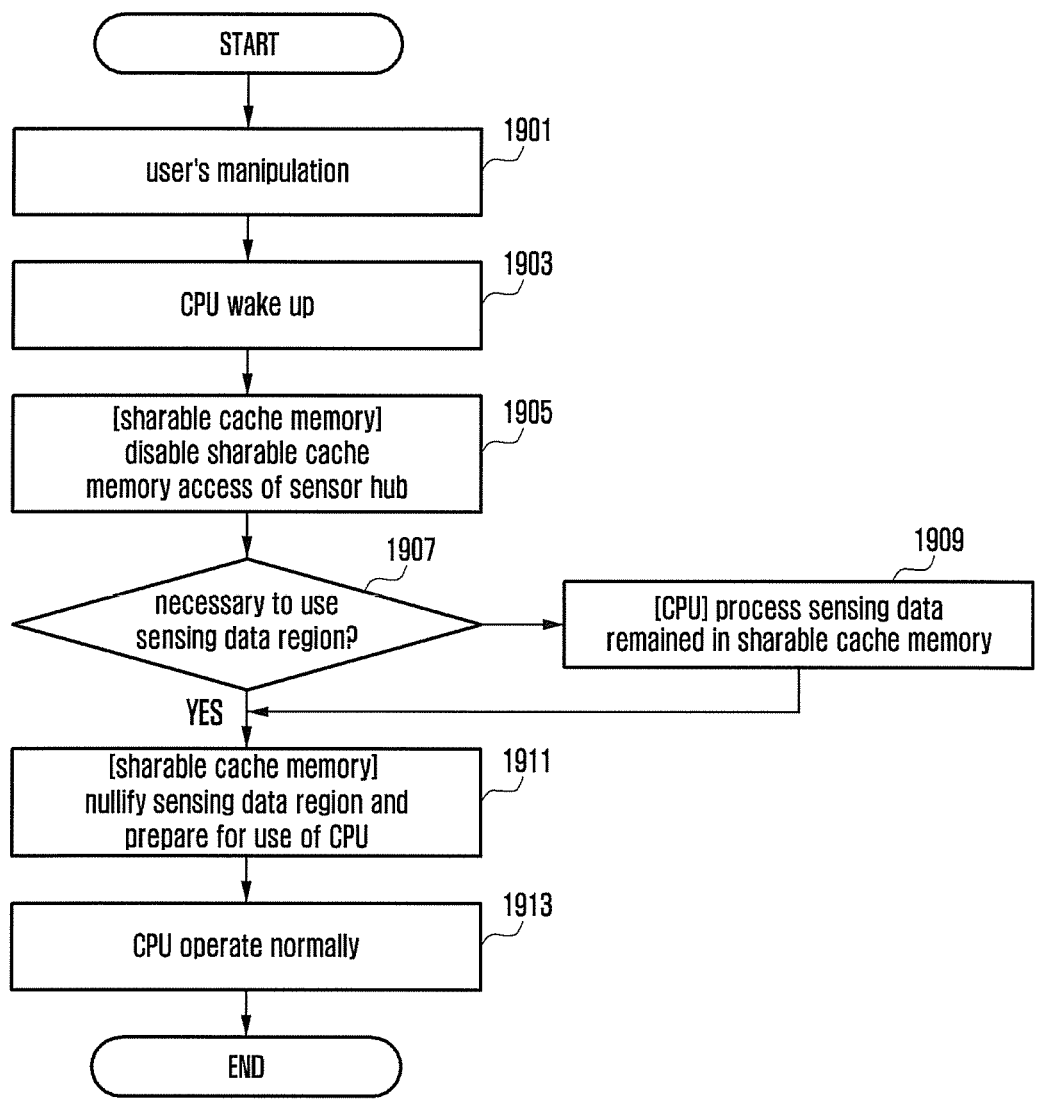

FIGS. 18 and 19 are flowcharts illustrating a method for an electronic device to process sensing data in the standby mode of the CPU according to various embodiments of the present disclosure.

According to an embodiment of the present disclosure, a mobile or wearable device use the sharable cache memory for providing services of using biological information of the user, location-based information, and external environment information. According to various embodiments, the external environment information includes temperature, humidity, brightness, and sound. Such services sample specific sensing data periodically and process the sampled data to provide useful information. If the periodically generated sensing data are written in the DRAM, the low power operation period of the DRAM is shortened, resulting in increase of power consumption. In order to overcome this problem, an embodiment of the present disclosure proposes a method of collecting the sensing data during a certain period of time and writing the collected data at a time.

Referring to FIG. 18, the CPU enters the standby mode at step 1801 and then the sharable cache memory allocates data memory (e.g. SRAM) to the sensor hub among the auxiliary processing units at step 1803. According to an embodiment of the present disclosure, the sensor hub is a unit capable of sensing at least one type of information, and it will be understood by those skilled in the art that the sensing hub indicates a sensing unit or a sensor sub-system. The sharable cache memory completes preparation for use of the allocated data memory region and transmits the preparation complete information to the switch unit connected to the sensor hub at step 1805.

The sensor hub performs a sensing operation to collect the biological information of the user or location information at step 1807. The sensor hub writes the collected information in the data memory allocated within the sharable cache memory at step 1809. The sensor hub determines whether the sensing period has ended at step 1811 and, if not, returns the procedure to step 1807.

If the sensing period has ended, the sensing hub wakes the CPU up at step 1813. The CPU wakes up at step 1815 and processes the sensing data, i.e. the written data, to output meaningful information at step 1817. The CPU writes the raw sensing data or the processed data in the DRAM at step 1819. The CPU determines whether to continue sensing at step 1821 and, if it is determined to continue sensing, enters the power saving mode at step 1823.

That is, the electronic device repeats the operation of controlling the CPU to wake up, when it becomes the time for the CPU to process the sensing data, and then to enter the standby mode repeatedly. In an exemplary situation where the user is jogging with the electronic device, the present disclosure makes it possible to minimize DRAM access attempts of the sensor hub for logging the sensed running distance or heart rate.

Referring to FIG. 19, the electronic device detects a user's manipulation at step 1901. Examples of the user's manipulation include a push on a button and a touch on the screen. In response to the user's manipulation, the CPU wakes up at step 1903. Next, the sharable cache memory disables the sharable cache memory access of the sensor hub at step 1905.

The CPU determines whether it is necessary to use cache for the sensing data in the data memory at step 1907. If it is necessary to use cache for the sensing data in the data memory, the CPU processes the sensing data in the data memory of the sharable cache memory at step 1909. Otherwise if it is not necessary to use cache for the sensing data in the data memory, the sharable cache memory nullifies the sensing data region and prepares for use of the CPU at step 1911. Afterward, the CPU operates normally to perform cache access to the sharable cache memory at step 1913.

In this embodiment, when the user turns on the terminal, the electronic device displays the sensing data, initializes the sensing data region for use as a CPU cache.

Figure 20:
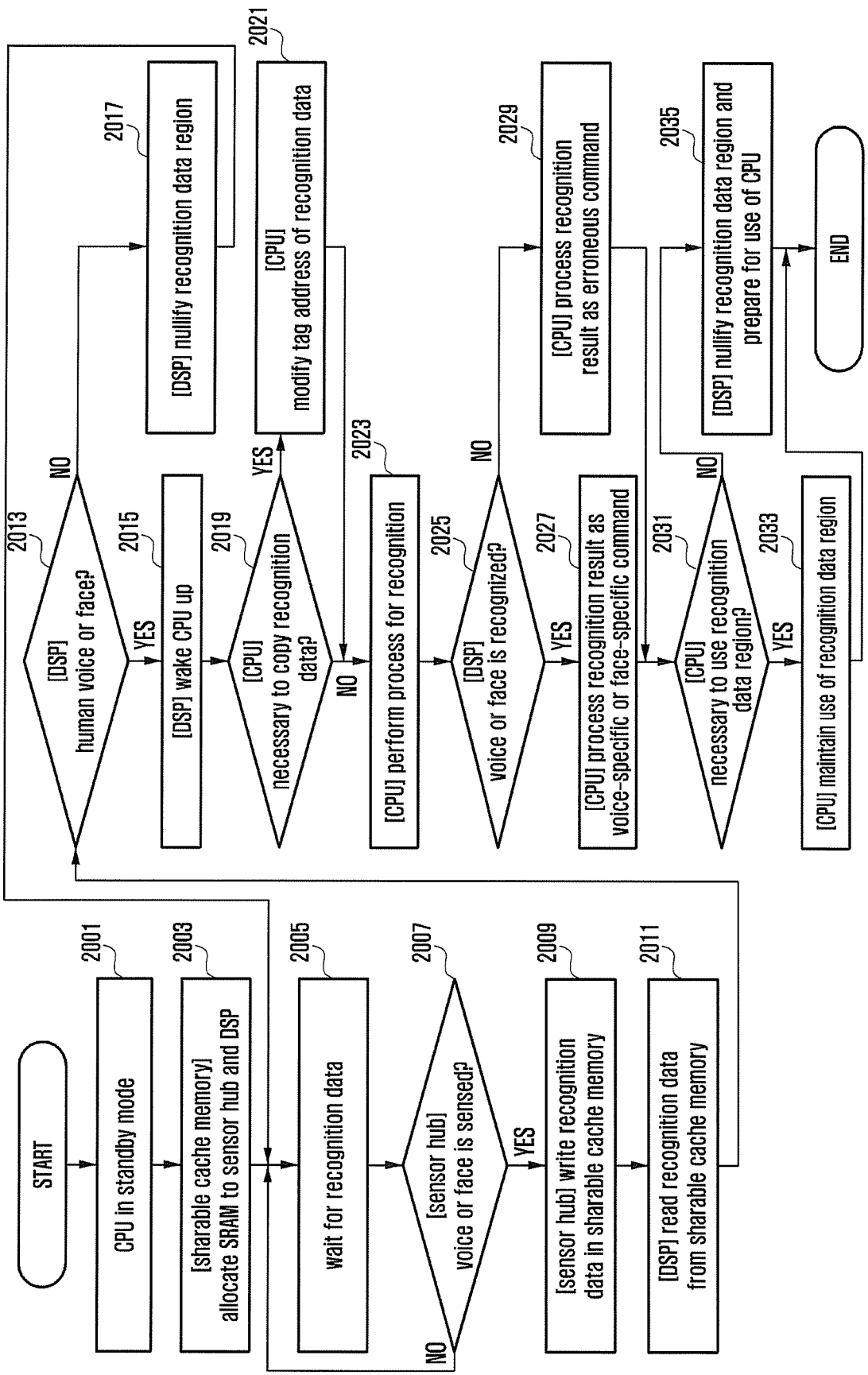
FIG. 20 is a flowchart illustrating a method for an electronic device to process voice or face recognition data in a standby mode of the CPU according to various embodiments of the present disclosure.

FIG. 20 is a flowchart illustrating a method for an electronic device to process voice or face recognition data in the standby mode of the CPU according to various embodiments of the present disclosure.

According to this embodiment, the electronic device applies the sharable cache memory management to the recognition-based services. The recognition-based services include a function of recognizing voice or face of a user and performing an operation based on the recognized voice or face. Since it is not necessary for the terminal to react to all sounds and images in the standby mode of the CPU, it is preferred to apply a scenario of triggering activation of the terminal in response to the recognition of a human voice or face.

Referring to FIG. 20, the CPU enters the standby mode at step 2001 and then the sharable cache memory allocates data memory (e.g. SRAM) to the sensor hub and DSP respectively among the auxiliary processing units at step 2003. According to various embodiments of the present disclosure, the sensor hub is an example of the sensing unit, and the DSP is an example of the auxiliary processor. The electronic device waits for receiving recognition data at step 2005. The sensor hub recognizes a human voice or face at step 2007 and writes the recognition data in the data memory allocated to the sensor hub within the sharable cache memory at step 2009.

The DSP reads the written recognition data at step 2011. The DSP determines whether the written recognition data match the human voice or face at step 2013. If the recognition data match the human voice or face, the DSP wakes the CPU up at step 2015. Otherwise if the recognition data do not match the human voice or face, the DSP nullifies the recognition data region at step 2017. After waking up, the CPU determines whether it is necessary to copy the recognition data at step 2019. If it is necessary to copy the recognition data, the CPU modifies the tag address of the recognition data at step 2021. Next, the CPU performs a process for recognition at step 2023. The CPU determines whether a human voice or face is recognized based on the recognition data at step 2025 and, if so, processes the recognition result as a voice-specific or face-specific command at step 2027 and, otherwise, processes the recognition result as an erroneous command at step 2029.

Afterward, the CPU determines whether it is necessary to continue using the recognition data region in the data memory of the sharable cache memory at step 2031. If it is necessary to continue using the recognition data region, the CPU maintains the use of the recognition data region at step 2033 and, otherwise, nullifies the recognition data region and prepares for use as the cache of the CPU at step 2035.

In the sharable cache memory management method according to an embodiment of the present disclosure, if the CPU cores enter the standby mode, this means that part or all of the CPU cores enter the sleep mode. The CPU cores in the working state perform the data processing operation of the DSP which is done while some cores are in the sleep state. The sharable cache memory management method of the present disclosure can be applied, in a similar manner, to the case where a dedicated auxiliary processor is used instead of the DSP.

As described above, the present disclosure is advantageous in terms of reducing power consumption and thus increasing the battery usage time by decreasing the number of DRAM accesses in the AP environment while the CPU is in the standby mode.

Also, the present disclosure is advantageous in terms of reducing the AP manufacturing cost by implementing various low power scenarios in the standby mode without extra SRAM.

Also, the present disclosure is advantageous in terms of improving user response speed by reducing shared data access latency between the CPU and auxiliary processing unit.

The unit or programming module of the present disclosure include at least one of the aforementioned components with omission of some components or addition of other components. The operations of the units, programming modules, or other components be executed in series, in parallel, recursively, or heuristically. Also, some operations be executed in different order, omitted, or extended with other operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a battery;
a central processing unit including a plurality of core processors;
modules; and
a sharable cache memory including a controller,
wherein the controller is configured to:
assign a storage area in the sharable cache memory for each of the plurality of core processors, the storage area being used by a corresponding core processor as a cache memory in a working mode,
monitor each operation mode of the core processors of the central processing unit,
identify whether an operation mode of at least one of the core processors is transitioned to a sleep mode from the working mode, and
switch a storage area of the sharable cache memory allocated to the at least one of the core processors transitioned to the sleep mode to a storage area for use in the modules,
wherein the modules are physically or logically separate from the central processing unit including the plurality of core processors,
wherein the sharable cache memory comprises a data memory including a plurality of banks capable of being used as one of the cache memory of the central processing unit or a buffer of at least one of the modules,
wherein the controller is configured to identify at least one bank allocated to the at least one of the core processors that is transitioned to the sleep mode and control to switch the at least one bank from a cache memory region to a buffer region, and
wherein the controller is configured to identify, if the operation mode of the at least one of the core processors of the central processing unit is transitioned to the sleep mode, at least one bank of which an allocation rate of a rest of the at least one of the core processors of the central processing unit is equal to or less than a threshold value and control to switch a region for an event of the at least one of the modules to a buffer region in the at least one identified bank in the data memory.

2. The electronic device of claim 1, wherein the controller is configured to allocate a buffer for at least one of the modules in the sharable cache memory based on at least one of software information associated with an execution function of the central processing unit, hardware information associated with a state of the at least one of the core processors of the central processing unit, or usage information of the sharable cache memory.

3. The electronic device of claim 1, wherein the sharable cache memory is configured to store at least one of a data memory address that is allocated in accordance with at least one event type of the at least one of the modules, and a priority of the at least one event type.

4. The electronic device of claim 1, further comprising a switching unit including at least one sub-switch unit connected to at least one module respectively, wherein each sub-switch unit is controlled to transfer a transaction associated with an event that is occurred from the connected at least one module to one of interconnecting units connected to a main storage unit and the sharable cache memory.

5. The electronic device of claim 4, wherein each sub-switch unit is controlled to transfer, if the operation mode of the at least one of the core processors of the central processing unit is transitioned to the sleep mode and preparation complete information is received from the sharable cache memory, the transaction being received afterward to the sharable cache memory.

6. The electronic device of claim 5, wherein each sub-switch unit includes a writing buffer for a writing transaction occurring before receiving the preparation complete information from the sharable cache memory after the at least one of the core processors of the central processing unit is transitioned to the sleep mode.

7. The electronic device of claim 1, wherein the controller is configured to disable, if the at least one of the core processors wakes up from the sleep mode, a buffer in the sharable cache memory and write contents of a region that is used as the buffer into a main storage unit selectively.

8. The electronic device of claim 1, wherein:
the at least one of the modules comprises an auxiliary processor, a communication unit, and a display unit, and
the controller is configured to:
allocate, if the operation mode of the at least one of the core processors of the central processing unit is transitioned to the sleep mode, data memory regions to the auxiliary processor, the communication unit, and the display unit, respectively to complete preparation for use of the allocated data memory regions as buffers;
control the communication unit to store, if message data are received, the received message data in a data memory region allocated to the communication unit;
control the auxiliary processor to generate a notification related to the received message data and store the notification in a data memory region allocated to the auxiliary processor; and
control the display unit to read the stored notification and display the read notification on at least one part of a display.

9. The electronic device of claim 1, wherein:
the at least one of the modules comprises an auxiliary processor and a display unit, and
the controller is configured to:
allocate, if the operation mode of the at least one of the core processors of the central processing unit is transitioned to the sleep mode, data memory regions to the auxiliary processor and the display unit, respectively, to complete preparation for use of the allocated data memory regions as buffers;
control the auxiliary processor to generate an image indicating a time and store the generated image in a data memory region that is allocated to the auxiliary processor; and
control the display unit to read the stored image and display the read image on at least part of a display.

10. The electronic device of claim 1, wherein:
the at least one of the modules comprises a sensing unit, and
the controller is configured to:
allocate, if the operation mode of the at least one of the core processors of the central processing unit is transitioned to the sleep mode, a data memory region to the sensing unit to complete preparation for use of the allocated data memory region as a buffer;
control the sensing unit to collect at least one of biological information and location information of a user and store the collected at least one of biological information and location information of the user in the data memory region that is allocated to the sensing unit; and
control the central processing unit to write, if the at least one of the core processors in the sleep mode wakes up, the collected at least one of biological information and location information that are stored in the data memory region allocated to the sensing unit into a main memory unit.

11. The electronic device of claim 1, wherein:
the at least one of the modules comprises a sensing unit and an auxiliary processor, and
the controller is configured to:
allocate, if the operation mode of the at least one of the core processors of the central processing unit is transitioned to the sleep mode, data memory regions to the sensing unit and the auxiliary processor to complete preparation for use of the allocated data memory regions as buffers;
control the sensing unit to store recognition data acquired by sensing one of a voice and face in a data memory region allocated to the sensing unit; and
control the auxiliary processor to read the recognition data to determine whether the recognition data is associated with one of a human voice and face, and wake up, if the recognition data is associated with one of a human voice and face, the at least one of the core processors from the sleep mode.

12. A method of a controller of a sharable cache memory of an electronic device having a battery, a central processing unit including a plurality of core processors, and modules, the method of the controller comprising:
assigning a storage area in the sharable cache memory for each of the plurality of core processors of the central processing unit, the storage area being used by a corresponding core processor as a cache memory in a working mode;
monitoring each operation mode of each of the plurality of core processors of the central processing unit;
identifying whether an operation mode of at least one of the core processors is transitioned to a sleep mode from the working mode; and
switching a storage area of the sharable cache memory allocated to the at least one of the core processors transitioned to the sleep mode to a storage area for use in modules of the electronic device,
wherein the modules are physically or logically separate from the central processing unit including the plurality of core processors,
wherein the sharable cache memory comprises a data memory including a plurality of banks capable of being used as one of the cache memory of the central processing unit or a buffer of at least one of the modules,
wherein the assigning the storage area in the sharable cache memory as the buffer of at least one of the modules, includes:
identifying at least one bank that is allocated to the at least one of the core processors that is transitioned to the sleep mode among a plurality of banks of the data memory included in the sharable cache memory, and
switching the at least one bank from a cache memory region to a buffer region, and
wherein the assigning the sharable cache memory as the buffer of the at least one of the modules comprises:
identifying, if the operation mode of the at least one of the core processors of the central processing unit is transitioned to the sleep mode, at least one bank of which an allocation rate of a rest of the at least one of the core processors of the central processing unit is equal to or less than a threshold value, and switching a region for an event of the at least one of the modules to a buffer region in the at least one identified bank in the data memory.

13. The method of claim 12, further comprising assigning the sharable cache memory as the buffer of the at least one of the modules, including allocating the buffer for the at least one of the modules in the sharable cache memory based on at least one of software information associated with an execution function of the central processing unit, hardware information associated with a state of the at least one of the core processors of the central processing unit, and usage information of the sharable cache memory.

14. The method of claim 12, further comprising assigning the sharable cache memory as a buffer of the at least one of the modules, including at least one of:
- determining an address of a data region to be used as the buffer according to a type of the event occurring at the at least one of the modules based on a configuration table stored in the sharable cache memory;
- identifying a priority of the event occurring at the at least one of the modules based on the configuration table; or
- switching a region for the event of the at least one of the modules to the buffer region according to the priority.

15. The method of claim 12, further comprising controlling at least one switch unit that is connected to at least one module to transfer a transaction associated with an event that is occurred from the connected at least one module to one of interconnecting units that is connected to a main storage unit and the sharable cache memory.

16. The method of claim 15, wherein controlling the at least one switch unit comprises transferring, if the operation mode of the at least one of the core processors of the central processing unit is transitioned to the sleep mode and preparation complete information is received from the sharable cache memory, the transaction being received afterward to the sharable cache memory.

17. The method of claim 15, further comprising processing a writing transaction occurring before receiving preparation complete information from the sharable cache memory in a write buffer after the at least one of the core processors of the central processing unit is transitioned to the sleep mode.

18. The method of claim 12, further comprising:
- disabling, if the at least one of the core processors of the central processing unit wakes up from the sleep mode, a buffer in the sharable cache memory; and
- writing contents of a region that is used as the buffer into a main storage unit selectively.

19. The method of claim 12, further comprising:
- allocating, if the operation mode of the at least one of the core processors of the central processing unit is transitioned to the sleep mode, data memory regions to an auxiliary processor, a communication unit, and a display unit to complete preparation for use of the allocated data memory regions as buffers;
- storing, if message data are received, the received message data in a data memory region allocated to the communication unit;
- generating a notification related to the received message data that is processed by the auxiliary processor;
- storing the notification in a data memory region allocated to the auxiliary processor;
- reading the stored notification; and
- displaying the stored notification on at least one part of a display.

20. The method of claim 12, further comprising:
- allocating, if the operation mode of the at least one of the core processors of the central processing unit is transitioned to the sleep mode, data memory regions to an auxiliary processor and a display unit to complete preparation for use of the allocated data memory regions as buffers;
- generating an image indicating a time that is determined by the auxiliary processor;
- storing the generated image in a data memory region allocated to the auxiliary processor;
- reading the stored image; and
- displaying the stored image on at least one part of a display.

21. The method of claim 12, further comprising:
- allocating, if the operation mode of the at least one of the core processors of the central processing unit is transitioned to the sleep mode, a data memory region to a sensing unit to complete preparation for use of the allocated data memory region as a buffer;
- collecting at least one of biological information and location information of a user that is processed by the sensing unit;
- storing the collected at least one of biological information and location information in the data memory region allocated to the sensing unit; and
- writing, if the at least one of the core processors of the central processing unit in the sleep mode wakes up, the collected at least one of biological information and location information stored in the data memory region allocated to the sensing unit into a main memory.

22. The method of claim 12, further comprising:
- allocating, if the operation mode of the at least one of the core processors of the central processing unit is transitioned to the sleep mode, data memory regions to a sensing unit and an auxiliary processor to complete preparation for use of the allocated data memory regions as buffers;
- storing recognition data acquired by the sensing unit that senses one of a voice and face in a data memory region allocated to the sensing unit;
- reading the recognition data that is processed by the auxiliary processor to determine whether the recognition data is associated with one of a human voice and face; and
- waking up, if the recognition data is associated with one of a human voice and face, the at least one of the core processors of the central processing unit from the sleep mode.

* * * * *